(12) United States Patent
Lyon

(10) Patent No.: US 6,721,273 B1
(45) Date of Patent: Apr. 13, 2004

(54) METHOD AND APPARATUS FOR TRAFFIC FLOW CONTROL IN DATA SWITCHES

(75) Inventor: Norman A. Lyon, Hull (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/496,651

(22) Filed: Feb. 3, 2000

(30) Foreign Application Priority Data

Dec. 22, 1999 (CA) .............................................. 2292828

(51) Int. Cl.[7] .......................... H04L 12/02; H04L 12/52
(52) U.S. Cl. .................. 370/235; 370/395.71; 370/413; 370/414
(58) Field of Search .............................. 370/235, 395.1, 370/396, 398, 395.71, 413, 414, 468

(56) References Cited

U.S. PATENT DOCUMENTS

| | | | | |
|---|---|---|---|---|
| 5,313,579 A | * | 5/1994 | Chao ........................... | 709/234 |
| 5,748,629 A | * | 5/1998 | Caldara et al. .............. | 370/389 |
| 5,757,771 A | * | 5/1998 | Li et al. ...................... | 370/235 |
| 5,774,454 A | * | 6/1998 | Kim et al. ................... | 370/232 |
| 6,097,698 A | * | 8/2000 | Yang et al. .................. | 370/231 |
| 6,215,788 B1 | * | 4/2001 | Sakurai et al. .............. | 370/391 |

* cited by examiner

Primary Examiner—Huy D. Vu
Assistant Examiner—Daniel Ryman

(57) ABSTRACT

Method and apparatus for traffic flow control in data switches are disclosed. Emission and loss priorities of cells to be switched are translated into a single discard priority, referred to as a bandwidth priority, which has consistent meaning across different emission priorities. This translation allows simultaneous consideration of loss and emission priority in determining which cells to discard when a switch becomes congested with cell traffic. Such consideration alleviates problems that can arise if cell discard decisions are based solely on either loss priority or emission priority. The invention is particularly useful for Asynchronous Transfer Mode (ATM) switches.

26 Claims, 21 Drawing Sheets

METHOD AND APPARATUS FOR TRAFFIC FLOW CONTROL IN DATA SWITCHES

FIELD OF THE INVENTION

The present invention relates to data switches and is particularly concerned with traffic flow control in such switches.

BACKGROUND OF THE INVENTION

In an input-output buffered data switch it is known to use an input priority scheduler at an input port of the switch. The input port has an input buffer comprised of input queues that are dedicated to an output port. The input priority scheduler controls the flow of cells from the input queues into the core of the switch. The output port includes an output buffer and may have output queues and an associated output scheduler.

Data protocol units, hereinafter referred to as cells, processed by the switch are stored in the input and output buffers as required in an effort to achieve lossless switching. Each cell carries an indication of the loss priority and emission priority of the cell. The loss priority relates to the relative preference of discarding a cell over other cells when such discarding is required, for example, when the switch becomes congested. Cells with higher loss priority are less preferred to be discarded than cells of lower loss priority. The emission priority relates to the relative preference of switching a cell over other cells. Cells with a higher emission priority are processed by the switch in preference to cells with a lower emission priority.

There are two problems that can arise in the control of cell traffic, both of which depend on emission priority and loss priority of cells. The first problem relates to input buffers assigned to the same destination output port. The problem is that cells with a given loss priority arriving at one input buffer do not have any better chance of being delivered to the output port, during a condition of switch congestion, than cells of a lower loss priority arriving at a different input buffer. The second problem relates to the emission priority assigned to queues of a given input buffer. The problem is that cell traffic of a higher emission priority could completely override cell traffic of a lower emission priority during a condition of high switch utilization, even including the higher loss priority cells of the lower emission priority traffic.

SUMMARY OF THE INVENTION

An object of the present invention is to provide an improved method and apparatus for traffic flow control in an input-output buffered ATM switch.

In accordance with an aspect of the present invention there is provided a data switch for switching data traffic in the form of cells, each cell having an indication of loss priority and emission priority of the cell, the data switch comprising: a plurality of input ports, each input port being operable to either forward or discard a cell in dependence upon a flow control message received at the input port; a switching fabric having multiple fabric inputs and multiple fabric outputs, the switching fabric being operable to switch a cell from any one of the fabric inputs to any one of a plurality of the fabric outputs, each of a plurality of the fabric inputs coupled to one of said input ports; a plurality of output ports, each output port being operable to transmit an output port message having an indication of the emission and loss priorities of a cell received from the switching fabric, each output port coupled to one of said fabric outputs; and a traffic flow controller coupled to the input and output ports, the traffic flow controller being operable to formulate, in dependence upon the output port messages, the flow control message indicating, for a particular output port, the loss and emission priorities of cells to discard that are destined for that particular output port.

The traffic flow controller translates two separate priorities, emission and loss priority, into a single discard priority, referred to herein as bandwidth priority (BP), which has consistent meaning across different emission priorities. This allows simultaneous consideration of loss and emission priority in determining which cells to discard, thereby alleviating the problems discussed above.

The input ports may each comprise a plurality of discarders, each of the discarders being associated with an output port and being operable to either forward or discard cells in response to the traffic flow control messages. Each of the discarders may comprise: a drop element having an input for receiving cells and an output for forwarding cells to the switching fabric, the drop element having an input for a drop signal and being operable to discard cells in dependence upon the drop signal; and a decoder having an input for receiving flow control messages and an output, coupled to the drop element, for transmitting a drop signal, the decoder operable to determine the output port indicated by the flow control message and formulate the drop signal according to the flow control message in dependence upon the indicated output port being associated with the discarder.

The output ports may each include a cell tap for monitoring the loss and emission priorities of cells being received by the output port and for transmitting these priorities in the output port messages. Alternatively, the output ports may each include a scheduler for granting the transmission of cells from the output port, each of the schedulers being operable to include, in an output port message, an indication of the emission priorities of cells granted transmission.

In accordance with another aspect of the present invention there is provided a traffic flow controller for controlling traffic congestion in a data switch, the data switch including multiple input ports and output ports, the data switch being operable to switch data traffic in the form of cells received at the input ports to the output ports, each cell having an indication of loss priority and emission priority of the cell, the input ports being operable to discard cells in dependence upon flow control messages received from the traffic flow controller, the output ports operable to send output port messages to the traffic flow controller, the output port messages containing an indication of loss and emission priorities of cells received at the respective output port. The traffic flow controller comprises: an accumulator for maintaining a count for each output port, each count corresponding to a level of congestion of its respective output port, the level of congestion effecting the number of cells in that output port; a memory for storing a bandwidth priority matrix which defines a bandwidth priority for each combination of loss priority and emission priority; a register for storing at least one threshold for each output port, each of the thresholds for an output port corresponding to a bandwidth priority; and a controller being operable to update and compare the count for each output port to the thresholds for the output port and determine the highest bandwidth priority corresponding to an exceeded threshold of that output port, determine for each emission priority, the bandwidth priority of cells to discard in dependence upon said highest bandwidth priority, and encode the bandwidth priority of cells to discard into a flow control message indicating the loss priority and emission priority of cells to discard, the controller coupled to the accumulator, the memory and the register.

For a data switch in which each of the output ports includes a plurality of output queues and each of the output queues is for queuing cells of a unique emission priority, the controller is operable to determine that, for each output queue of an output port, cells having a lower bandwidth priority than the highest bandwidth priority corresponding to an exceeded threshold of that output queue are to be discarded if they have the same emission priority of that output queue or a higher emission priority. Further, for such a data switch, the accumulator in the traffic flow controller comprises a counter for each of the output queues, each of the counters being operable to store the count corresponding to the level of congestion in its respective output queue.

The controller may include: an incrementor, coupled to the counters, for receiving output port messages and incrementing the counters in dependence upon the output port messages; a timer for determining a cell period; a priority scheduler, coupled to the timer, for determining for each output port, which counter to decrement in any given cell period, the priority scheduler operable to select the counter of the highest emission priority having a non-zero count; a decrementor, coupled to the counters, for causing a counter to be decremented in response to the priority scheduler; and an encoder for comparing the count of each output queue to the thresholds of the output queue and determine the highest bandwidth priority corresponding to an exceeded threshold of that output queue, determining for each emission priority, the bandwidth priority of cells to discard in dependence upon said highest bandwidth priority corresponding to the emission priority, and encoding the bandwidth priority of cells to discard into a flow control message indicating the loss priority and emission priority of cells to discard, the controller coupled to the counters, the memory and the register.

Alternatively, for a data switch in which the output ports include a scheduler for granting the transmission of cells from the output port, each of the schedulers being operable to include, in an output port message, an indication of the emission priorities of cells granted transmission: the memory is further for storing a sets of state variables, each set of state variables representing transient congestion conditions of each output port, and storing a set of increment variables for incrementing the counts; the controller is operable to update each set of state variables by determining, for each output port, a highest congested emission priority without a grant and for filtering out transient downward priority changes thereto, and updating each of the counts in dependence upon the increment variables and the set of state variables associated with the output port; and the controller is further operable to determine that cells having a lower bandwidth priority than the highest bandwidth priority corresponding to an exceeded threshold of the output port are to be discarded if they have the same, or higher, emission priority as the highest congested emission priority of that output port. Additionally, in updating each set of state variables the controller may further be operable to filter out transient periods of no congestion.

According to yet another aspect of the present invention there is provided a method of controlling traffic flow in a data switch, the data switch operable to switch data traffic in the form of cells, each cell including a loss priority and an emission priority of the cell, the data switch including multiple input ports and output ports, the method comprising the steps of: assigning a bandwidth priority to each combination of loss and emission priority; updating a count, the count corresponding to a level of traffic congestion in particular output port; determining, for the particular output port and for each emission priority, the bandwidth priorities of cells to discard in dependence upon the count associated with the particular output port; translating the bandwidth priorities of cells to discard into loss and emission priorities of cells to discard; and discarding, at the input ports, cells destined for the particular output port in response to the cells having loss and emission priorities matching said loss and emission priorities of cells to discard.

Additionally, for a data switch in which the particular output port includes a plurality of output queues and each of the output queues is for queuing cells of a unique emission priority, and the particular output port further includes a scheduler for granting the transmission of cells from the output queues, the scheduler being operable to include, in an output port message, an indication of the emission priorities of cells granted transmission, the step of updating a count includes the steps of: calculating, for the particular output port, state information which represents transient traffic congestion conditions at the particular output port; and updating, for the particular output port, the respective count in dependence upon the state information of the particular output port.

BRIEF DESCRIPTION OF THE DRAWINGS

The present invention will be further understood from the following detailed description, with reference to the drawings in which.

DETAILED DESCRIPTION

Figure 1:
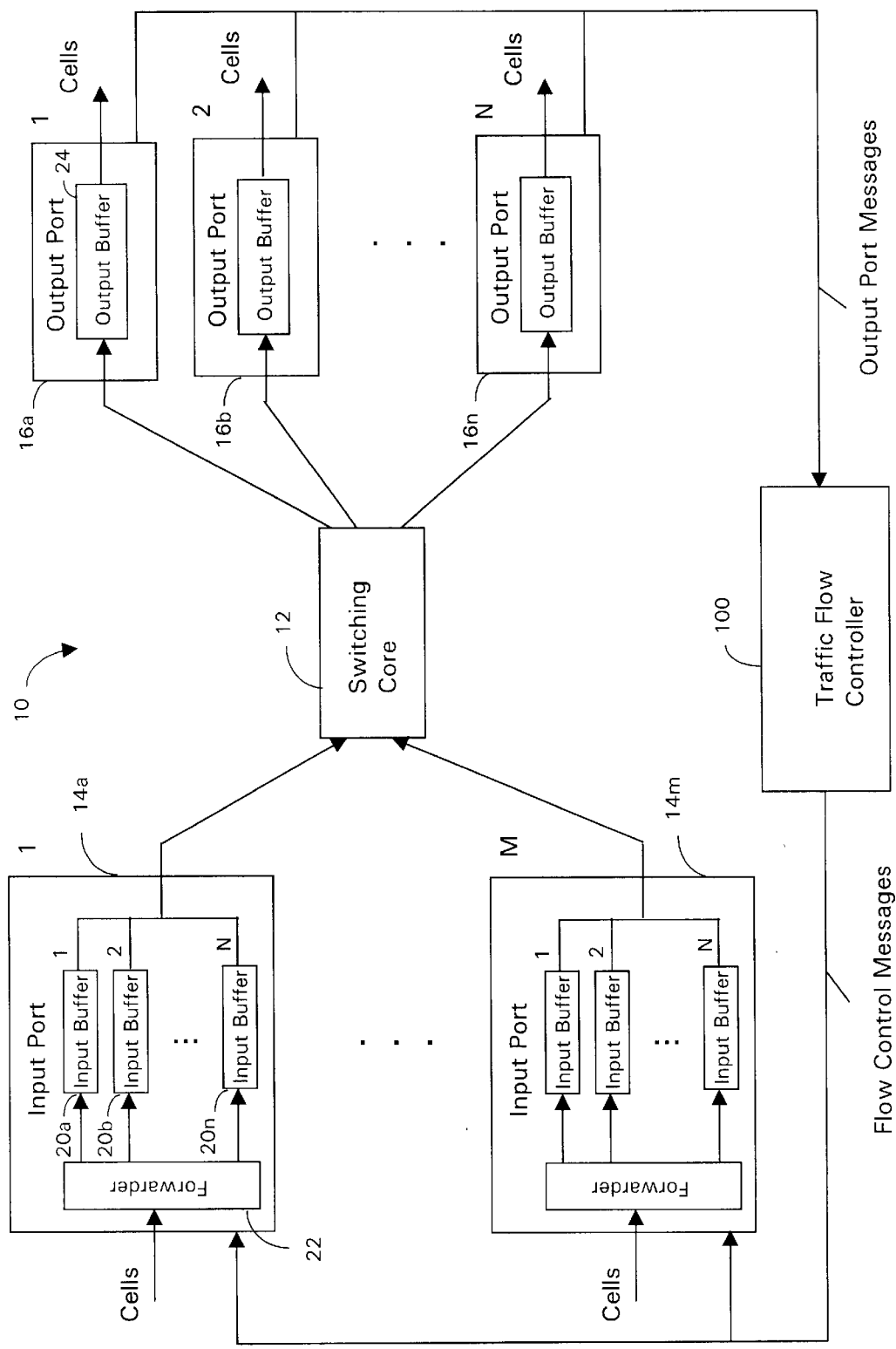
FIG. 1 is a functional block diagram of an input-output buffered data switch in accordance with an embodiment of an aspect of the present invention.

FIG. 1 shows in a functional block diagram a data switch 10 in accordance with an embodiment of the present invention. The switch 10 includes a switching core 12, connected to a plurality (M) of input ports, 14a to 14m, and a plurality (N) of output ports, 16a to 16n. The numbers M and N could be equal but do not need to be, typically, N and M are in the range of 16 to 32. A traffic flow controller (TFC) 100 is coupled between the plurality of output and input ports. The TFC 100 controls the flow of cells into the switching core 12 in dependence upon signalling, in the form of input port and output port messages, from the plurality of input and output ports, respectively. Each of the input ports, 14a to 14m, further comprises a plurality (N) of input buffers 20a to 20n, one buffer for each destination output port, 16a to 16n. With reference to the input port 14a, each input buffer, 20a to 20n, is coupled to a respective output of a forwarder 22. Each output port, 16a to 16n, includes an output buffer 24, coupled between the input and the output of its output port, for storing cells before they are outputted by the output port at its line rate.

Figure 2:
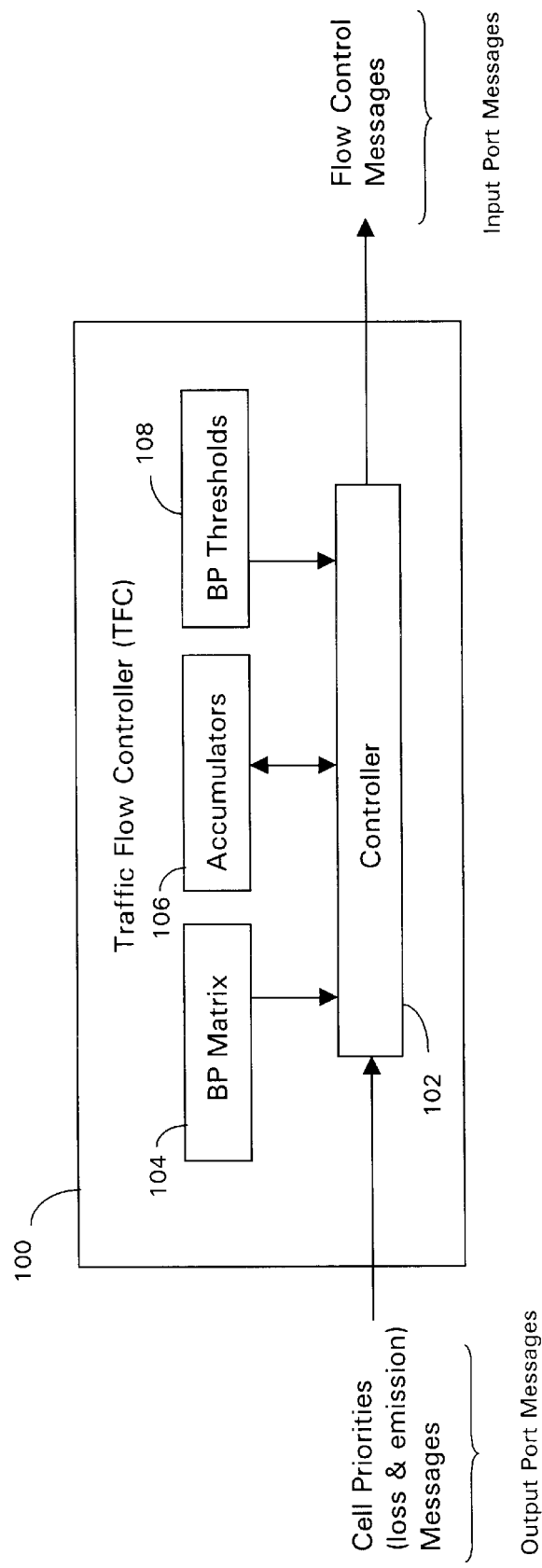
FIG. 2 is a functional block diagram showing the traffic flow controller of FIG. 1 in greater detail.

FIG. 2 is a functional block diagram showing the TFC 100 of FIG. 1 in greater detail. The TFC 100 includes a controller 102, coupled to an input of the TFC 100 for receiving the output port messages. The output port messages are in the form of cell loss and emission priorities messages. The controller 102 is also coupled to an output of the TFC 100 for outputting the flow control messages. The TFC 100 also includes a bandwidth priority (BP) matrix 104, accumulators 106, and BP thresholds 108, all of which are coupled to the controller 102. The controller 102 performs a method of traffic flow control in accordance with an embodiment of another aspect of the present invention, as will be described later. The BP matrix 104 is a table, stored in a memory or registers, having a BP priority level for each possible combination of emission and loss priority levels. Thus, the BP matrix provides a means to translate two separate priority levels, emission and loss priority, into a single loss priority level, BP priority, which has consistent meaning across all the emission priority levels, as will be described herein. The accumulators 106, implemented as variables in a memory or as counters, count the number of cells for each BP priority level destined for a particular output port, 16a to 16n, and being buffered by the switch 10. The BP thresholds 108 are values stored in a memory, or register, used to determine which cells to discard, in dependence upon the BP priority level assigned to the cell and related counts in the accumulators 106. The BP Matrix 104, Accumulators 106, and BP thresholds 108 could be stored in a single memory, in which case the TFC 100 would consist of the single memory and the controller 102.

Figure 3:
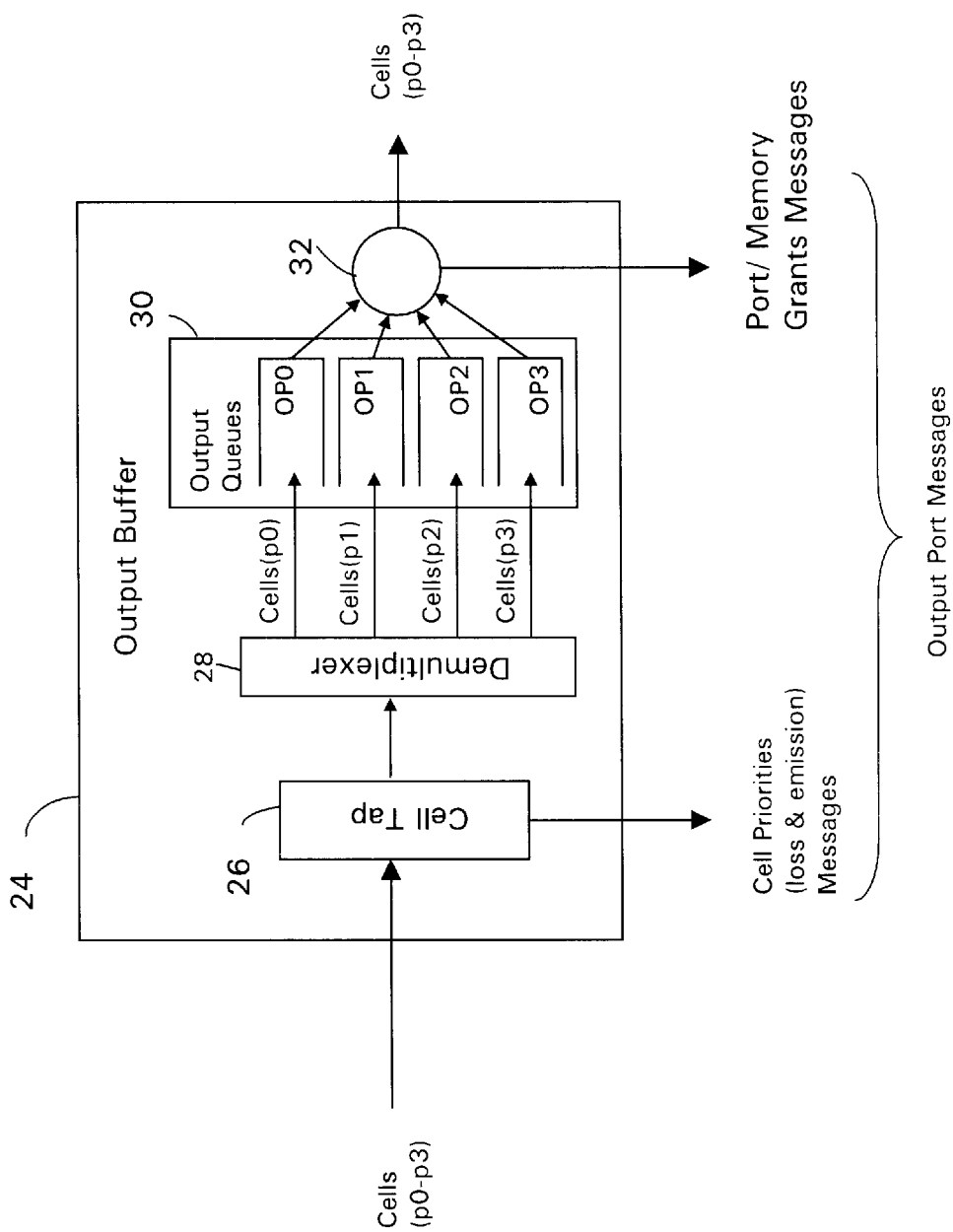
FIG. 3 is a functional block diagram showing the output buffer of FIG. 1 in greater detail.

FIG. 3 is a functional block diagram showing the output buffer 24 of FIG. 1 in greater detail. The output buffer 24 has a cell input and a cell output for receiving and transmitting cells, respectively. The output buffer 24 also has message outputs for sending output buffer messages. The message outputs include a priorities output for sending cell priorities messages, which include the loss and emission priorities of cells received at the cell input. The message outputs also include a grants output for sending port and memory grant messages, which include the emission and loss priorities of cells scheduled for outputting from the cell output.

The output buffer 24 includes a cell tap 26, a demultiplexer 28, a set of output queues, and a scheduler 32. The cell tap 26, coupled to the cell input, is for reading the loss and emission priorities of incoming cells and outputting their cell priorities to the TFC 100. The cell tap 26 has an output coupled to the priorities output for this purpose, and another output, for passing the incoming cells into the remainder of the output buffer 24, coupled to an input of a demultiplexer 28. The demultiplexer 28 is for dividing cells into flows based on the emission priority, p0 to p3, of the cells received from the cell tap 26. The demultiplexer 28 has four outputs for this purpose, each of which is coupled to a respective output queue, OP0 to OP3, of the set of output queues 30. The demultiplexer 28 receives incoming cells, divides them into separate flows, one flow for each emission priority level, p0 to p3, and outputs the cells on respective outputs. The set of output queues 30, with inputs coupled to the outputs of the demultiplexer 28, receives the flows of cells, p0 to p3, and stores them in respective output queues, Op0 to OP3. The scheduler 32, coupled to an output of each of the output queues, Op0 to OP3, follows priority scheduling to schedule emission of the cells from the output buffer 24 according to the emission priority level of the cells. The scheduler 32 is coupled to the cell output of the output buffer 24 for this purpose, and has an output coupled to the grants output of the output buffer 24 for sending information on the scheduled cells in the form of port grants, or memory grants, messages. The purpose of this information will be described later with respect to a second embodiment of the TFC 100. Each output buffer 24 of the plurality (N) of output ports, 16a to 16n, of FIG. 1 need not be identical to one another, however, typically they would be identical.

Figure 4:
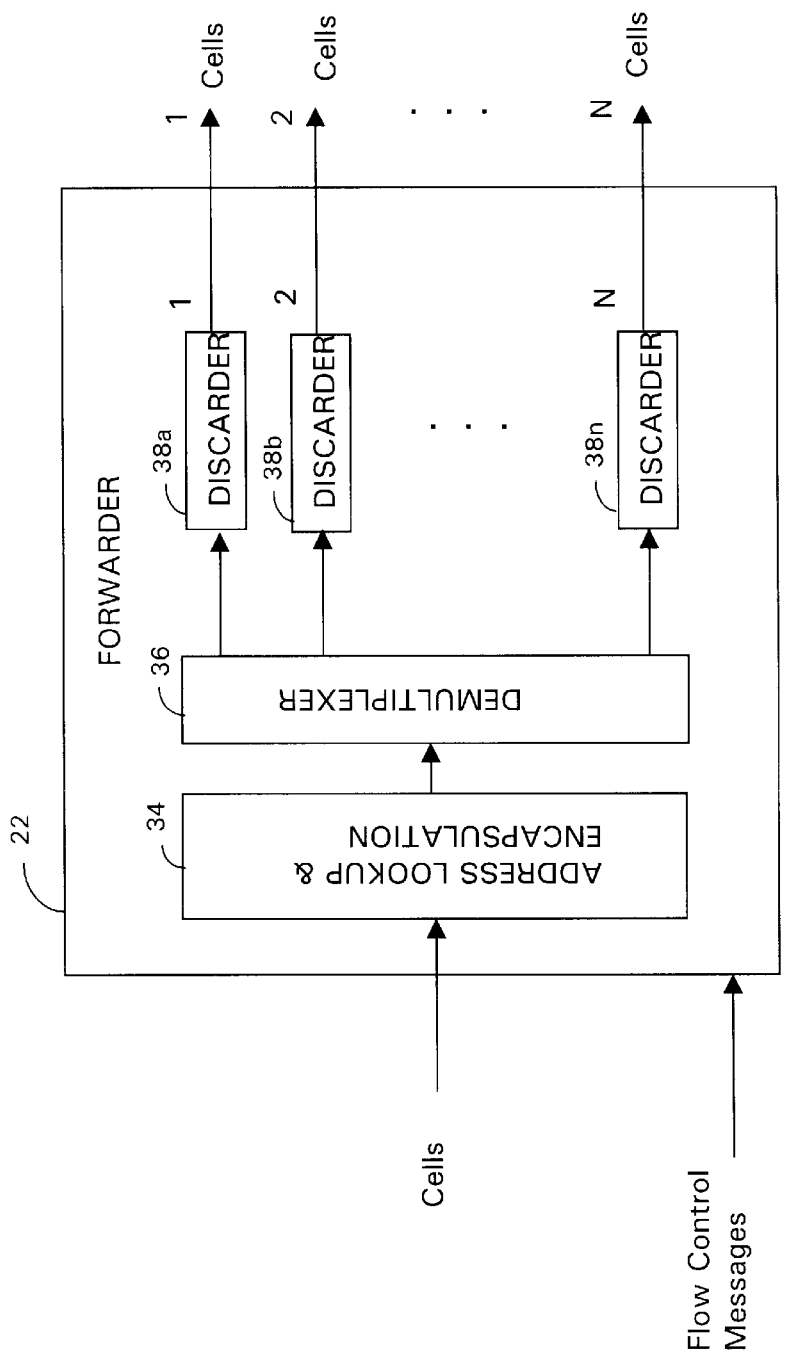
FIG. 4 is a functional block diagram showing the forwarder of FIG. 1 in greater detail.

FIG. 4 is a functional block diagram showing the forwarder 22 of FIG. 1 in greater detail. The forwarder 22 has a cell input for receiving incoming cells, a message input for receiving flow control messages, and a separate cell output for each flow of cells destined for a particular output port, 16a to 16n. The forwarder includes an address lookup and encapsulation block 34, for receiving cells, determining the destination output port of each received cell and encapsulating the cell with a switching header, which indicates its destination. The address lookup and encapsulation block 34 has an input coupled to the cell input of the forwarder 22 and an ouput for forwarding encapsulated cells into the remainder of the forwarder 22. The forwarder 22 further includes a demultiplexer 36, which has an input for receiving encapsulated cells and a separate cell output, each associated with a respective destination output port, 16a to 16n. The forwarder 22 further includes a plurality (N) of discarders, 38a to 38n, each discarder is coupled to an output of the demultiplexer 36. The discarders, 38a to 38n, discard cells as determined by flow control messages received by the forwarder 22, from the TFC 100.

Figure 5:
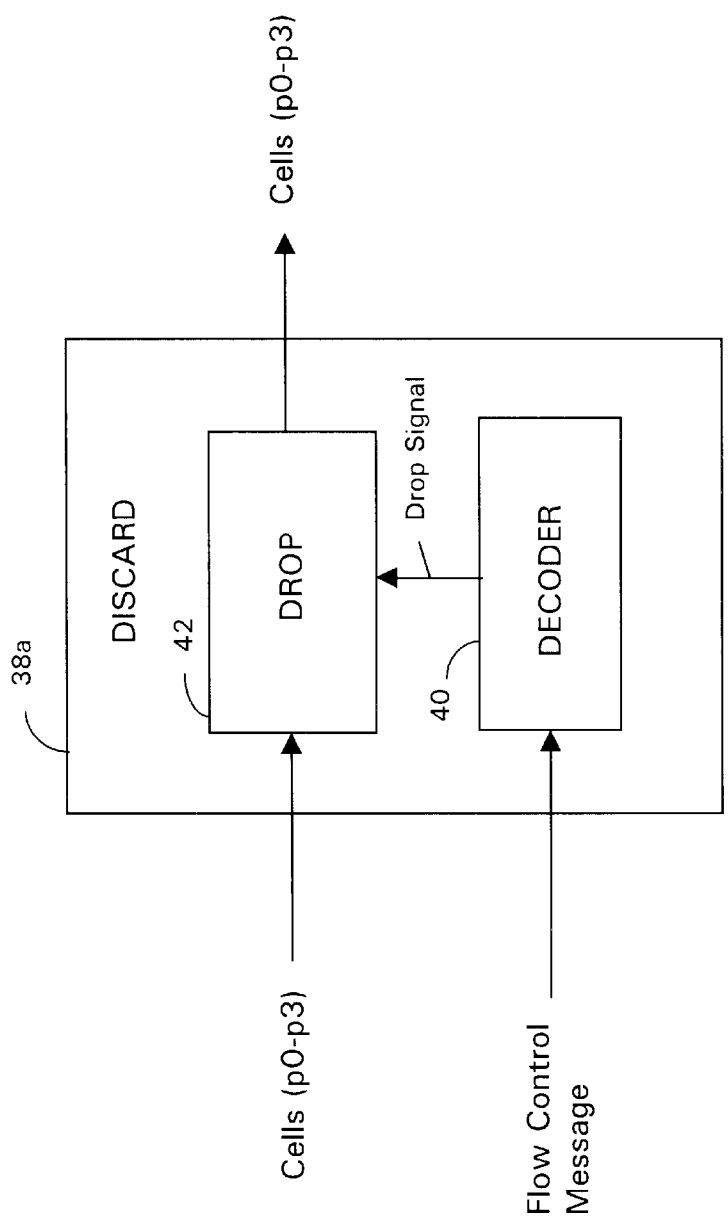
FIG. 5 is a functional block diagram showing the discarder of FIG. 4 in greater detail.

FIG. 5 is a functional block diagram showing the discarder 38a of FIG. 4 in greater detail. All of the discarders, 38a to 38n, in FIG. 4 are identical. The discarder 38a has a cell input for receiving cells, a message input for receiving flow control messages, and a cell output for emitting cells.

The discarder 38a includes a decoder 40 and a drop element 42. The decoder 40 has an input, coupled to the message input of the discarder 38a, for receiving flow control messages, and an output for sending a drop signal to the drop element 42. The decoder 40 receives flow control messages and decodes them in order to determine the output port, loss priority, and emission priority of cells to be dropped. These priorities are contained in the drop signal, which is output by the decoder 40. The drop element 42 has cell input and outputs coupled to respective cell inputs and outputs of the discarder 38a, and has an input coupled to the output of the decoder 40 for receiving the drop signal. In dependence upon the drop signal, the drop element 42 passes some or all of the received cells, from the cell input to the cell output of the discarder 38a. The drop element 42 examines the loss and emission priority of each cell it receives and discards a cell if it has an emission and loss priority that matches the emission and drop priorities contained in the drop signal.

Figure 6:
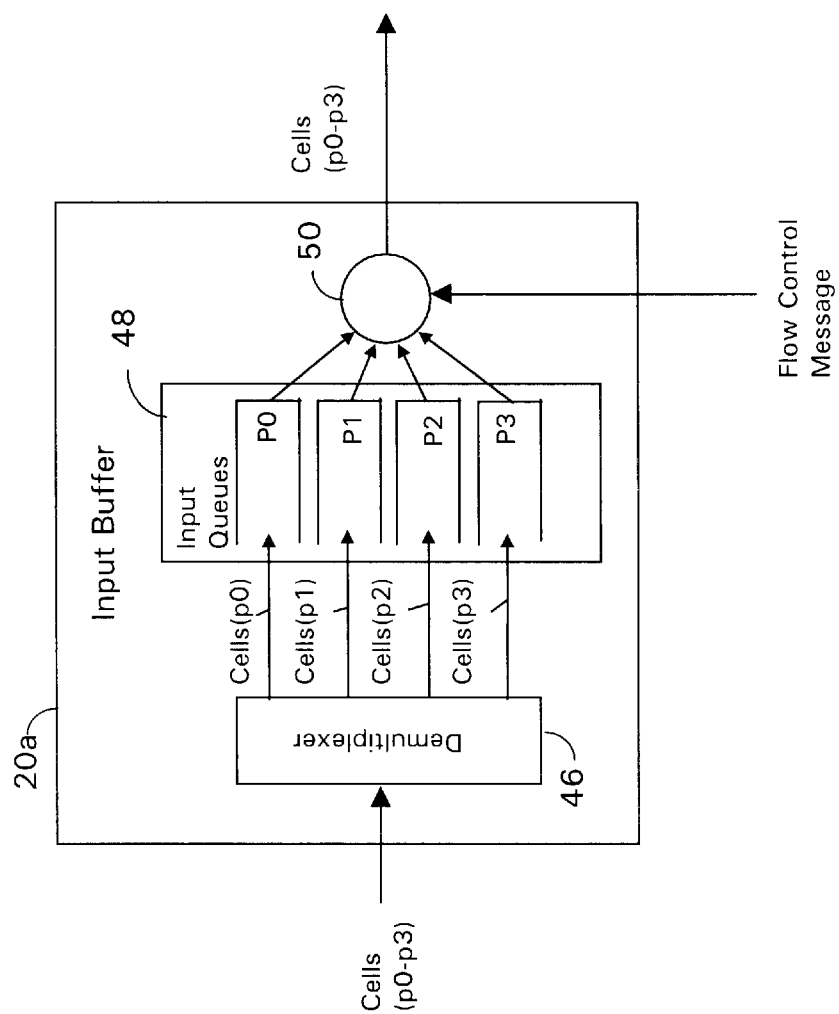
FIG. 6 is a functional block diagram showing the input buffer of FIG. 1 in greater detail.

FIG. 6 is a functional block diagram showing the input buffer 20a of FIG. 1 in greater detail. The buffers of the plurality (N) of input buffers, 20a to 20n, of FIG. 1 are identical to each other. The input buffer 20a has a cell input and a cell output for receiving and transmitting cells, respectively, and a message input for receiving flow control messages. The input buffer 20a includes a demultiplexer 46, a set of input queues 48, and a scheduler 50. The demultiplexer 46, coupled at its cell input to the cell input of the input buffer 20a, is for dividing received cells into flows of cells according to their emission priority level. Cells of emission priorities p0 to p3 are divided into four flows, Cells (p0 to p3). The set of input queues 48, coupled to these outputs of the demultiplexer 46, is for receiving the flows of cells and storing them in respective queues. The set of input queues 48 has four queues, P0 to P3, for this purpose. The set of input queues 48 is coupled at its outputs to a scheduler 50, which schedules the egress of cell from the input buffer 20a according to the emission priority of the cells, as described below.

The scheduler 50 controls the flow of cells from the input queues, P0 to P3, into the switching core 12 in dependence upon the emission priority, p0 to p3, of the cells and signalling in the form of flow control messages received from the TFC 100. The scheduler 50 follows simple priority scheduling, whereby cells in a higher priority queue, for example queue P0, are transferred into the switching core 12 in preference to cells in the next lower priority queue, for example P1, and so on for the remaining lower priority queues, P2 and P3. When the scheduler 50 receives a flow control message indicating that flow control should be performed on cells of a given emission priority, the scheduler 50 stops the transfer of cells of that emission priority, until another flow control message indicates that the flow control should be terminated.

With reference FIGS. 1 to 6 and to the ATM paradigm, operation of the data switch will now be described. Cells are received at the input ports, 14a to 14m, each of the cells having a designated cell loss priority (CLP), CLP0 or CLP1, and emission priority, p0 to p3. Cells destined for the output port 16a, for example, are stored in the input queues, P0 to P3, of the input buffer 20a, which is associated with that output port 16a. The input buffer 20a in each of the input ports 14a to 14m, is associated with the output port 16a. Likewise, the other output ports, 16b to 16n, have a respective input buffer, 20b to 20n, in each of the input ports, 14a to 14m. The demultiplexer 46, divides the received cells according to their emission priority into four flows, labelled as cells (p0) to cells(p3) in FIG. 6, and directs each flow to its respective input queue, P0 to P3. As cells are input to a queue, other cells are transmitted out of the same queue and into the switching core 12 by the scheduler 50 in a first-in-first-out (FIFO) order. The scheduler 50 repetitively causes one cell to be transmitted from the highest priority non-empty input queue. Where the arrival rate of cells into a queue is greater than the departure rate of cells from the same queue, the queue size will necessarily increase.

Cells arriving at the switching core 12 are then processed by it and are forwarded to their respective destination output port, 16a to 16n. As shown in FIG. 3, cells of priority p0 to p3, arriving at the output buffer 24 of the output port 16a, for example, are stored in the output buffer 24 before being transmitted from the output port 16a at the port line rate. Where the cells arrive at the output buffer 24 at a rate faster than they depart, the number of cells in the set of output queues 30 will increase. Similarly, the count of cells in the set of output queues 30 will decrease whenever the converse situation occurs. Whenever the number of cells in the set of output queue 30 surpasses a flow control threshold, the TFC 100 will initiate flow control of cells destined for-the output port 16a. The TFC 100 sends a flow control message to the scheduler 50 in each of the input buffers 20a, associated with the output port 14a, to effect the desired type of traffic flow control. The type of traffic flow control depends on the amount of congestion at a given output port, 16a to 16n. This amount of congestion is indicated by the number of cells stored in the set of output queues 30 of the particular output port, 16a to 16n. At lower levels of congestion the TFC 100 sends a discard message to the discarders, 38a to 38n, to effect dropping of cells of specific loss and emission priority levels, as will be described later. At higher levels of congestion, cells of different loss and emission priority levels will be discarded. At still higher levels of congestion, the TFC 100 will send a flow control message to cause the schedulers 50, in input buffers associated with the congested output port, in each of the input ports, 14a to 14n, to stop sending all cells to that output port.

Typically, the switching core 12 is "sped up" which means that it runs at a rate that is faster than the line rate of the output ports, 14a to 14n. For example, a port of the switching core 12 may run at 125% of the line rate. It should be noted that each of the input ports, 14a to 14m, is not in communication with any of the other input ports, 14a to 14m. Further, the input buffers 20a associated with to the output port 16 a, for example, are not in communication with each other since those input buffers 20a are in different input ports, 14a to 14m.

Figure 7:
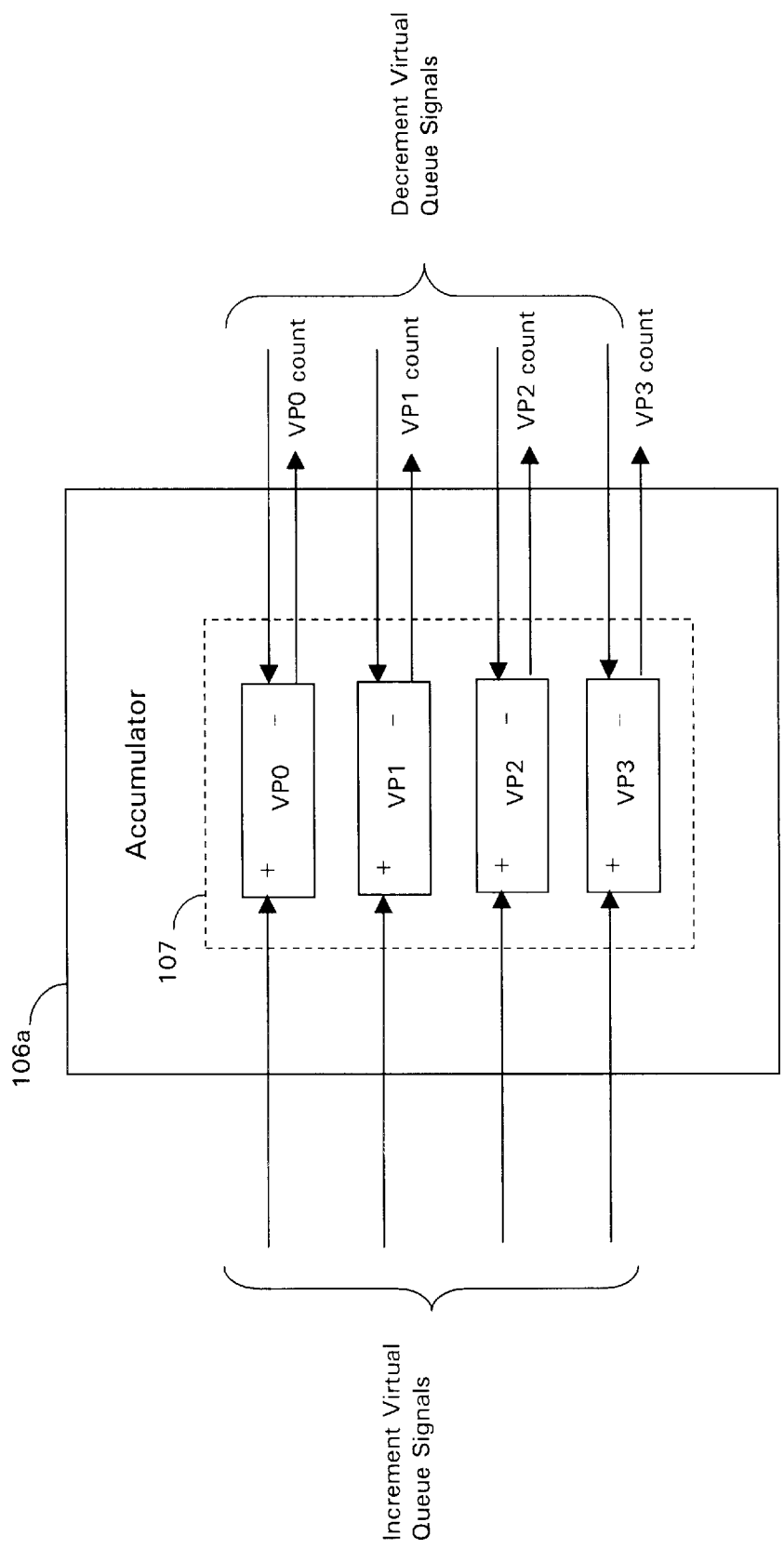
FIG. 7 is a functional block diagram showing one of the accumulators of FIG. 2 in greater detail.

FIG. 7 is a functional block diagram showing one of the accumulators of FIG. 2 in greater detail. The accumulators 106 includes a plurality (N) of accumulators, 106a to 106n, each corresponding to a particular output port, 16a to 16n, and identical to one another. The accumulator 106a includes a block of virtual queues 107 having a respective virtual queue, VP0 to VP3, for each output queue, OP0 to OP3, of its corresponding particular output port. For example, the virtual queue 106a corresponds to the output port 16a, and has virtual queues, VP0 to VP3, which correspond to the output queues, OP0 to OP3, of the output port 16a. The virtual queues, VP0 to VP3, each store a count, which corresponds to the number of cells stored in its respective output queue, OP0 to OP3. Each of the virtual queues, VP0 to VP3, has an input for receiving an increment virtual queue signal. The increment virtual queue signal causes the count in the virtual queue to be incremented by one. Each of the virtual queues, VP0 to VP3, also has an input for receiving a decrement virtual queue signal. The decrement virtual queue signal causes the count in the virtual queue to be decremented by one. Each of the virtual queues, VP0 to VP3, further has an output for outputting a message, VP0 to VP3 count, containing the count in the virtual queue.

Figure 8:
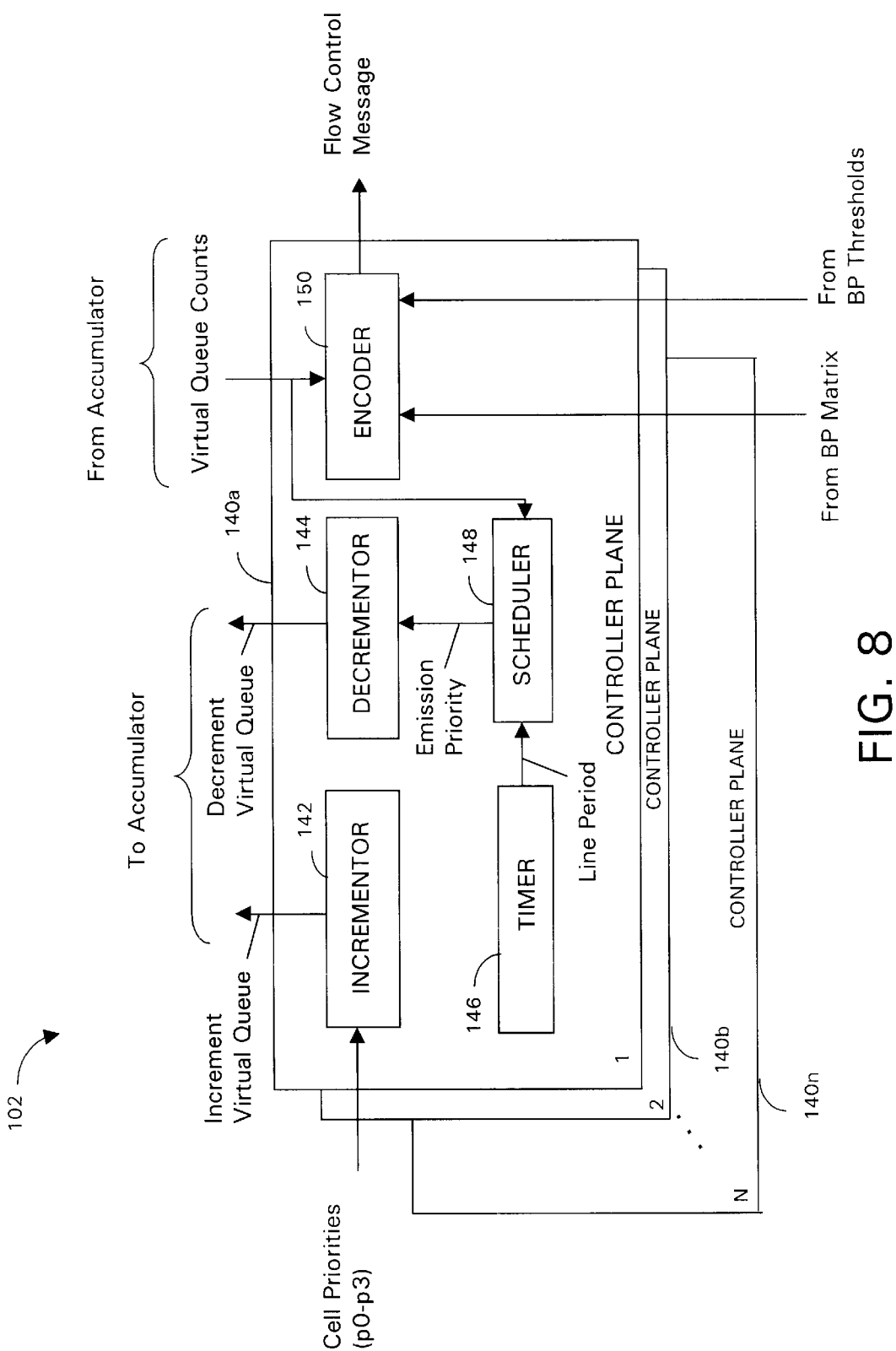
FIG. 8 is a functional block diagram showing a first embodiment of controller of FIG. 2.

FIG. 8 is a functional block diagram showing a first embodiment of the controller 102 of FIG. 2. The controller 102 has a dimension of N corresponding to the number (N) of output ports, 16a to 16n. A controller plane 140a, for the output port 16a is shown. There is a plurality (N) of controller planes, 140a to 140n, each is associated with a respective output port, 16a to 16n, and is identical to the others. The controller plane 140a has an input coupled to the BP matrix 104, an input coupled to the BP thresholds 108, and an input coupled to the particular output port (x) for receiving cell priorities messages from the cell tap 26. The controller plane 140a also has an input, coupled to the accumulators 106, for receiving virtual queue counts for the output port 16a. The controller plane 140a further includes outputs also coupled to the accumulators 106, for incrementing and decrementing the virtual queues, VP0 to VP3, corresponding to the output port 16a. The controller plane 140a still further has an output for sending flow control messages to the input buffer 20a, associated with the output port 16a, in each of the input ports, 14a to 14m.

The controller plane 140a includes an incrementor 142, coupled to the input for cell priorities and the increment output for virtual queues, for determining which virtual queue to increment, VP0 to VP3, in dependence upon the content of the cell priorities message. The virtual queue, VP0 to VP3, that corresponds to the emission priority, p0 to p3, contained in the cell priorities message will be incremented in response to an increment virtual queue signal which is sent from the incrementor 142.

The controller plane 140a further includes a timer 146 for calculating a line period, based on the line rate of the particular output port (x). A scheduler 148 coupled to the timer 146 and the input for virtual queue counts, receives the line period and virtual queue counts. The scheduler is for determining the emission priority to be scheduled in the current line period. This scheduling is done in accordance with the strict priority scheduling described earlier, in dependence upon the counts of the virtual queues. A decrementor 144, coupled to the scheduler and the decrement output of the controller plane 140a, receives the scheduled emission priority from the scheduler 148. The decrementor 144 determines the virtual queue, VP0 to VP3, to decrement independence upon the received emission priority. The virtual queue, VP0 to VP3, that corresponds to the scheduled emission priority, p0 to p3, will be decremented in response to a decrement virtual queue signal sent by the decrementor 144.

The controller plane 140a further includes an encoder 150. The encoder 150 is coupled to the inputs for the BP matrix, BP thresholds, and virtual queue counts, and is also coupled to the output for flow control messages. The encoder 150 receives the virtual queue counts and determines the emission and loss priority of cells to discard based on these counts, the BP thresholds and the BP matrix. This determination will be described in more detail later. The encoder 150 processes one scheduling priority, p0 to p3, per cell time (i.e. line period), and encodes the discard information in a flow control message, which is sent to the input buffer 20a, associated with the output port 16a, of the input ports 14a to 14m.

The timer 146 could instead provide a virtual line period, which is the cell period of the sped-up switching core 12 multiplied by a speed-up factor. For example, if the speed-up factor is 125%, the virtual line period will be 125% of the cell period. The timer 146 includes an 8-bit register which allows tuning in steps of less than 0.5%. It is also possible to set the virtual line period to be different from the actual line period, for example smaller, so that the virtual queues, VP0 to VP3, will present a looser constraint than the output queues, OP0 to OP3. The timer 146 uses a clock signal from the switching core 12, a frequency multiplier, and a resetable counter to obtain the virtual line period set by the 8-bit counter. Such means for obtaining a desired frequency from a clock signal are well known in the art.

The virtual queues VP0 to VP3 are implemented as 24 bit up/down counters. The incrementor 142 and decrementor 144 comprise logic gates that decode the 2-bit emission priority, p0 to p3, to provide clock and enable signals for the virtual queues, VP0 to VP3. The scheduler 148 logically ORs the output bits of a counter using logic gates to detect a non-zero output for that counter. The timer 146 includes an 8-bit register and a counter that is incremented every sped-up cell period. When the counter overflows the scheduler 148 causes one of the up/down counters to decrement. The above hardware for the controller plane 140a is implemented on an integrated circuit. The integrated circuit contains controller planes, 140a to 140p, for 16 output ports, 16a to 16p.

In operation, cells entering the output buffer 24 of the output port 16a are tapped by the cell tap 26. The cell tap 26 simply copies the emission priority, p0 to p3, represented as a 2-bit binary number, of each cell and sends this information to the incrementor 142, with the cell continuing on to one of the output queues, OP0 to OP3, via the demultiplexer 28. The incrementor 142 increments the count in the virtual queue, VP0 to VP3, that corresponds to the emission priority of the cell. In this way, the virtual queues, VP0 to VP3, are incremented in a manner that coincides to actual incrementing of the output queues OP0 to OP3, due to cell arrivals at those queues. The scheduler 148 initiates a decrement for each virtual line period indicated by the timer 146. The scheduler 148 selects the highest priority virtual queue, VP0 to VP3, with a non-zero queue count and causes that virtual queue count to be decremented. This is done by notifying the decrementor 144 of the emission priority of the virtual queue that is to be decremented. The decrementor 144 then decrements the queue count of the virtual queue that corresponds to that emission priority. In this way, the virtual queues, VP0 to VP3, are decremented in a manner that coincides to actual decrementing of the output queues, OP0 to OP3, due to cell departures from those queues.

As mentioned above, the virtual line period does not have to coincide with the actual line rate of the output port. The timer 146 could output timing corresponding to the cell period of the sped-up switching core 12. The result would be that virtual queue, VP0 to VP3, counts would decrease faster than the counts of the output queues, OP0 to OP3. Thus, the encoder 150 would not detect congestion as readily as would otherwise be the case, and consequently fewer cells would be dropped at the input ports, 14a to 14m. Of course, the converse is also possible and would result in more cells being dropped at the input ports, 14a to 14m. Additionally, this feature could be used to accommodate output ports, 16a to 16n, of different line rates by setting the timer 146 to a virtual line period corresponding to the line rate of the particular output port.

Figure 9:
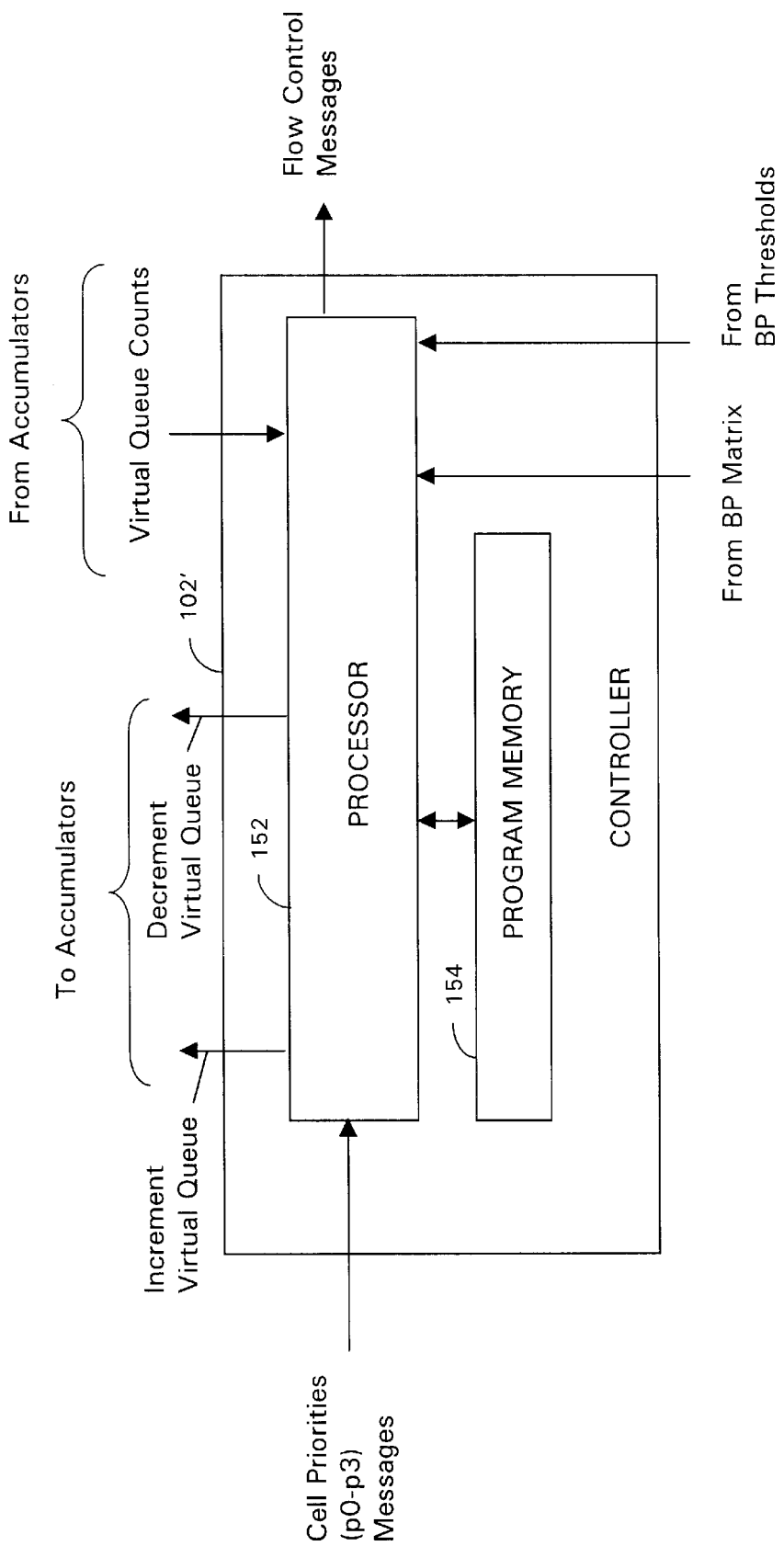
FIG. 9 is a functional block diagram showing a second embodiment of the controller of FIG. 2.

FIG. 9 is a functional block diagram showing a second embodiment 102' of the controller of FIG. 2. The controller 102' has the same input and outputs as the first embodiment of the controller 102. In this embodiment, all of the controller planes, 140a to 140n, are implemented as a software program and variables stored in a memory 154, with a processor 152 executing the program. The program implements the functions of the incrementor 142, the decrementor 144, the timer 146, the scheduler 148, and the encoder 150, for each of the controller planes, 140a to 140n.

Figure 10:
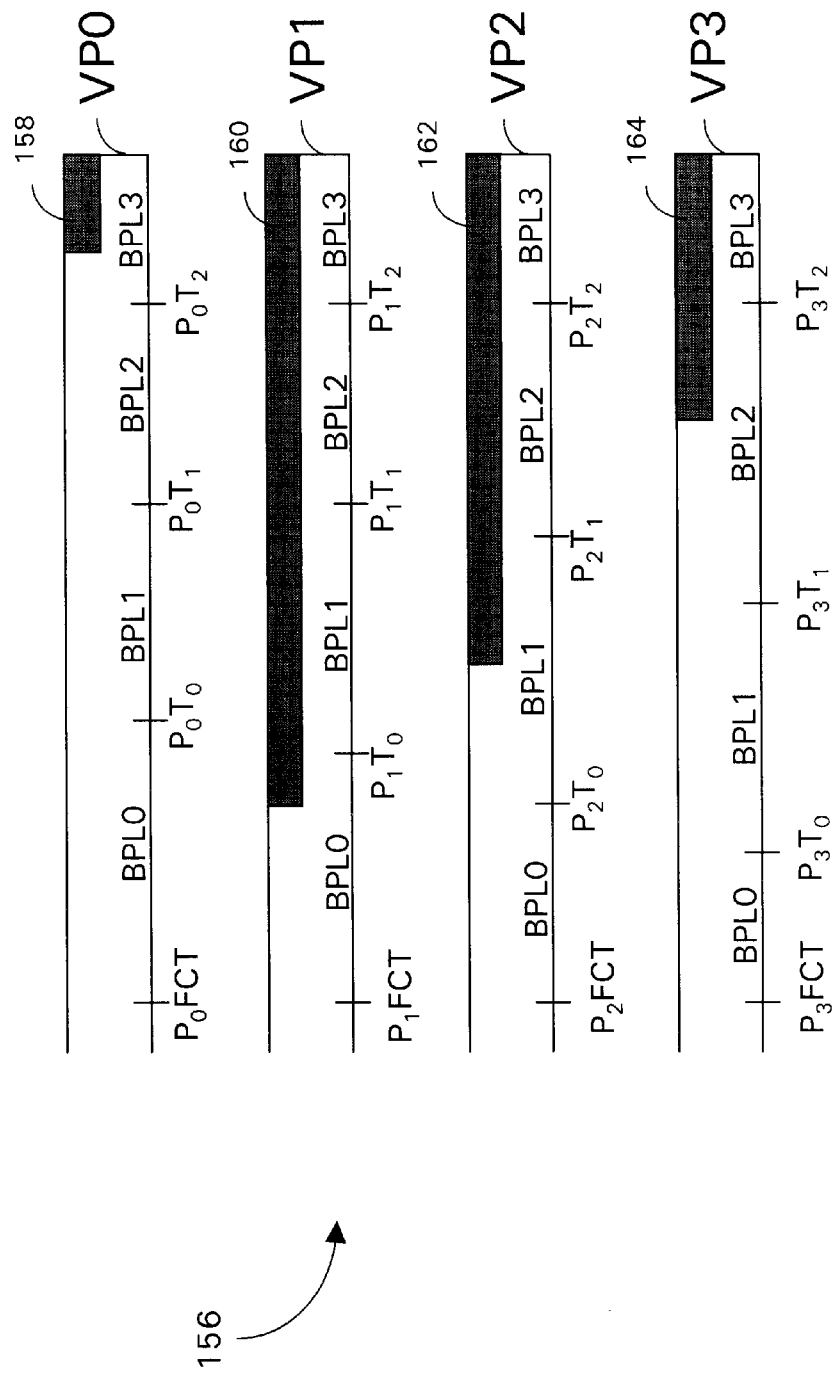
FIG. 10 is a graphical representation of the virtual queues of FIG. 7.

FIG. 10 is a graphical representation 156 of the virtual queues, VP0 to VP3, of FIG. 7. Each of the virtual queues, VP0 to VP3, shows respective counts, 158 to 164, in black shading. The virtual queue VP0 has four bandwidth priority levels labelled BPL0 to BPL3 delimited by three bandwidth priority thresholds P0T0, P0T1, and P0T2, respectively. The virtual queue VP0 will fill from right to left, such that as the count 158 of the virtual queue VP0 increases from zero it begins at bandwidth priority level BPL3. As the count 158 increases, it crosses the first bandwidth priority threshold P0T2 into the second bandwidth priority level BPL2, and so forth into the other bandwidth priority levels BPL1 and BPL0 as the count 158 crosses the other bandwidth priority thresholds P0T1 and P0T0, respectively.

Similarly, virtual queues VP1 to VP3 have bandwidth priority thresholds P1T0 to P1T2, P2T0 to P2T2, and P3T0 to P3T2, respectively. These bandwidth priority thresholds delimit their respective virtual queues into four bandwidth priority levels BPL0 to BPL3 in the same manner as virtual queue VP0. Finally, each of the virtual queues VP0 to VP3 has a flow control threshold, labelled P0FCT to P3FCT, respectively, which delimits the bandwidth priority level BPL0 for the virtual queue.

Referring to Table 1 below, which shows a BP matrix for ATM cells, groups are formed from the emission priority flows, p0 to p3, and the CLP loss priority sub-flows therein. Each group is assigned a bandwidth priority (BP). Table 1 shows an example grouping and bandwidth priority assignment for four emission priority flows, p0 to p3, two CLP levels, CLP0 and CLP1, and four bandwidth priority levels, BP0 to BP3. The bandwidth priority BP0 has the highest priority, or importance, followed by successively less importance for the bandwidth priorities BP1 to BP3. The bandwidth priority of a cell arriving at an input buffer 20a of a particular input port, 14a to 14m, will be used in conjunction with the count of its corresponding virtual queue and bandwidth priority thresholds to determine if the cell should be dropped. This determination will be explained in more detail later.

TABLE 1

| Bandwidth Priority BP Matrix | | |
|---|---|---|
| | CLP0 | CLP1 |
| p0 | BP0 | BP0 |
| p1 | BP0 | BP1 |
| p2 | BP0 | BP2 |
| p3 | BP1 | BP3 |

Returning to FIG. 10, an example count, 158 to 164, for each virtual queue, VP0 to VP3, is shown in black. The counts, 158 to 164, for the virtual queues VP0 to VP3 are in the bandwidth priority level BPL3, BPL0, BPL1, and BPL2, respectively. It is helpful to note that when a particular emission priority flow is congested, it is desirable to discard the combined best-effort traffic at the priority of that flow and higher priority flows, but not of lower priority flows. Accordingly, when a virtual queue corresponding to a priority (p) has a count at a bandwidth priority level BPL(I), it means that the bandwidth priority BP(I) is beginning to congest, and the cells of the bandwidth priority BP(I+1) and lower importance should be dropped in flows of priority (p) and higher importance.

With respect to the example counts, 158 to 164, shown in FIG. 10, and the bandwidth priority levels shown in Table 1, the above guideline for dropping cells will be applied. The virtual queue VP3 has a count 164 in the bandwidth priority level BPL2, hence this condition requires that cells of the bandwidth priority BP3 should be dropped in flows of emission priority p3 to p0. The virtual queue VP2 has a count 162 in the bandwidth priority level BPL1, therefore this condition further requires that cells of the bandwidth priority BP2 and lower importance (i.e. BP3) should be dropped in flows of emission priority p2 to p0. The virtual queue VP1 has a count 160 in the bandwidth priority level BPL0, consequently this condition further requires that cells of the bandwidth priority BP1 and lower importance (i.e. BP2 and BP3) should be dropped in flows of emission priority p1 to p0. Finally, the virtual queue VP0 has a count 158 in the bandwidth priority level BPL3, hence this condition does not add a further requirement to drop cells since there is no lower bandwidth priority than BP3. The bandwidth priorities of cells to be dropped from the above example are shown in shading in Table 2 (Table 2 has the same bandwidth priority assignments as Table 1).

TABLE 2

| Bandwidth Priority BP Matrix of Dropped Cells | | |
|---|---|---|
| | CLP0 | CLP1 |
| p0 | BP0 | BP0 |
| p1 | BP0 | BP1 |
| p2 | BP0 | BP2 |
| p3 | BP1 | BP3 |

Further with respect to FIG. 10, there are shown flow control thresholds P0FCT to P3FCT for the virtual queues VP0 to VP3, respectively. When the count of a virtual queue crosses its flow control threshold, transmission of all cells of the flow corresponding to the priority of the virtual queue should be stopped.

Returning to the operation of the controller plane 140a, as one of the virtual queues, VP0 to VP3, starts to become congested it triggers dropping of cells of bandwidth priority BP(I) and lower importance in the congested queue and queues of higher importance. Recalling that the switching core 12 is sped-up, for example to 125% of the line rate, the rate of increase of the count of the congested virtual queue will begin to decrease with the dropping of cells. Consider for example a scenario where a majority of cells arriving at the input port 14a have an emission priority p0, and therefore the rate of increase of the count of the virtual queue VP0, and the output queue OP0, is almost 125% of the line rate. As the virtual queue VP0 becomes congested it will trigger dropping of cells by the discarder 38a. As this happens, the rate of increase of the count 158 of the virtual queue VP0 will begin to decrease and will approach 100% of the line rate. Consequently, in the switching core 12 there will be an unused bandwidth available to the output port 16a in the amount of 25% of the line rate. This unused bandwidth will provide the queues of emission priority less than p0, that is, priority p1 to p3, with cells of lower importance (i.e. bandwidth priority> BP(I)). In this way, the starvation, or shutout, of lower priority flows p1 to p3 is prevented.

Figure 11:
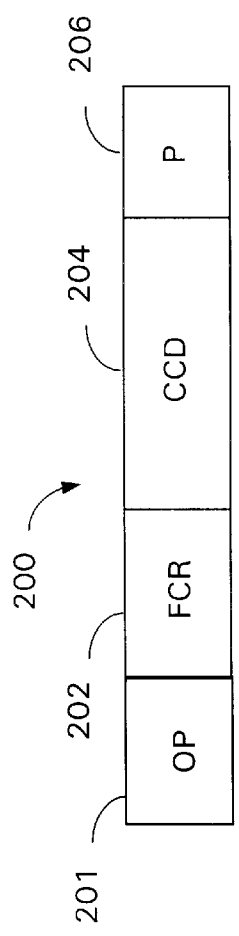
FIG. 11 is an illustration of the format of the flow control messages output by the traffic flow controller of FIG. 1.

FIG. 11 is an illustration of the format of the flow control messages 200 output by the TFC 100. The message 200 contains an output port field (OP) 201, a flow control request (FCR) field 202, a congestion control drop (CCD) field 204, and a current emission priority (P) field 206. The output port field (OP) 201 designates the output port to which the flow control message pertains. The FCR field 202 is a 1-bit field and is set to one if flow control is being requested for the current emission priority, p0 to p3. Otherwise, the FCR field 202 is set to zero. The CCD field 204 is a two-bit field that specifies CLP levels, CLP0 and CLP1, of the cells to be dropped for the current emission priority, p0 to p3. The most significant bit (rightmost bit) stores an indication for CLP0 cells and the other bit stores an indication for CLP1 cells. When a bit of the CCD field 204 is set it indicates that cells of the corresponding CLP type should be discarded for the current emission priority. The P field 206 is a 2-bit field, which stores the current emission priority, p0 to p3, as a binary number from 0 to 3 to represent the respective emission priorities.

Figure 12:
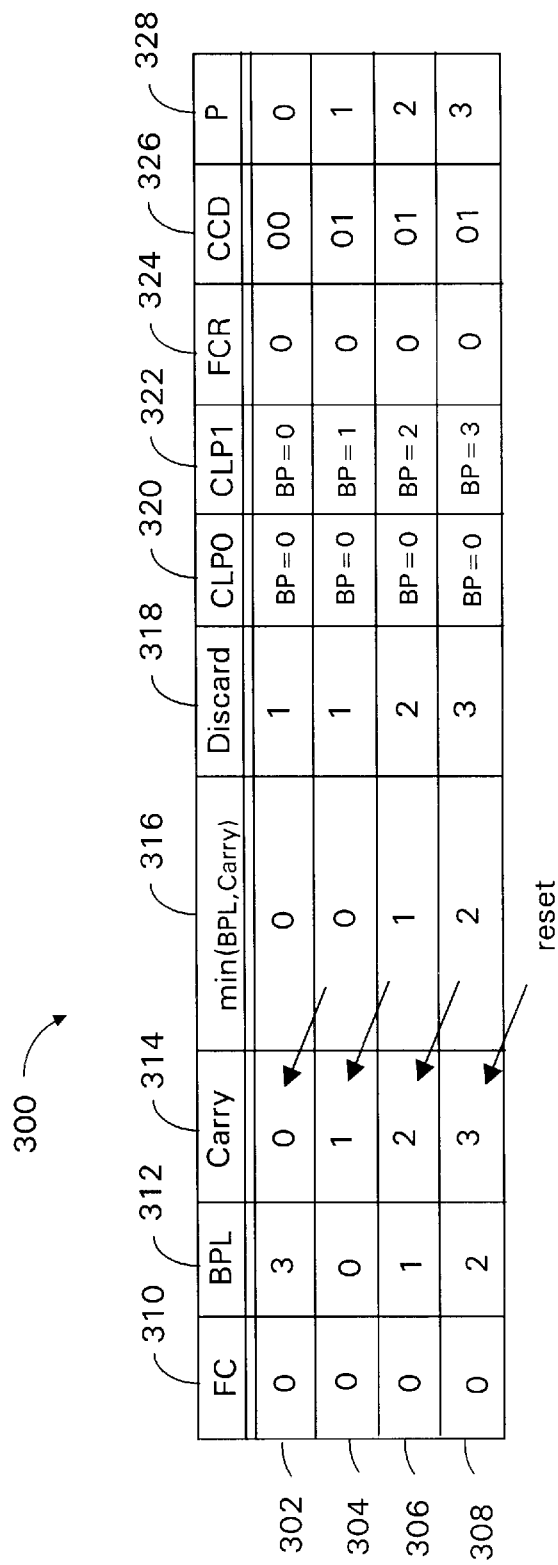
FIG. 12 is a table illustrating data used and operations performed by the controllers of FIGS. 9 and 10.

FIG. 12 is a table 300 illustrating data used and operations performed by the controllers of FIGS. 9 and 10. The table 300 provides an example BP matrix, queue counts, and calculations to explain the operation of the encoder 150. The virtual queue counts depicted in FIG. 3 are used in this example. Each row 302, 304, 306, 308 in FIG. 12 represents a different emission priority, p0 to p3, with p0 corresponding to the top row. The encoder 150 cycles through the rows, from the bottom of the table 300 to the top, at least once every N (N=4) cell periods, determining the BP level of cells to discard. In the following discussion, references to current emission priority refer to the priority of the current row, in the table 300, being processed by the encoder 150.

Moving from left to right, the first column 310 shows the value of the FCR field that will be written into the flow control message 200 for each emission priority, p0 to p3. Note that all rows have an FCR value equal to zero because none of the virtual queues have a count that exceeds its FCT threshold. The next column 312 numerically shows the BP level for each queue. These levels are the same as those shown in FIG. 10. The next column 314 shows the value of a Carry, which carries a value from the previous, or lower emission priority, to the next, or higher emission priority. The Carry is reset to three at the start of each p3 emission priority scheduling cycle. The next column 316 shows the minimum value of the BP level and the Carry for the current emission priority. This value becomes the Carry for the next higher emission priority. In this example, the bottom row 308 shows the Carry reset to a value of three and the BP level for the emission priority p3 to be two. Consequently, the minimum of the BP level and Carry values is two, and the value two becomes the Carry for the next emission priority, p2. This transition is shown by the arrows in the figure.

The next column 318 shows the BP level of cells to be discarded in the current emission priority and higher emission priorities. Recall that the BP of cells to be discarded is the congested BPL and lower BPLs in the current emission priority and higher emission priorities. Accordingly, the discard column 318 shows the value of the minimum column 316 plus one in the current row. The discard value is compared to the BP assigned in the BP matrix for the current emission priority. The BP values assigned in the BP matrix are shown for CLP0 and CLP1 in columns 320 and 324, respectively. The last three columns labelled FCR 324, CCD 326 and Priority 328 show the values for the FCR field 202, the CCD field 204 and the P field 206 that will be written into the flow control message 200. If the BP value is greater than or equal to the discard value for the current row then the CCD bit for the corresponding CLP is set to one, otherwise it is set to zero. The count of the virtual queue for the current emission priority is compared with the flow control threshold of that virtual queue. If the count exceeds the threshold, then the FCR field bit is set to one to request flow control for the current emission priority. The schedulers 50 implement flow control according to received flow control messages. The P field is simply the binary representation of the number of the current emission priority.

Referring again to FIG. 5, the use of the flow control messages 200 by the discarder 38a will now by described. The discarder 38a includes the drop element 42 and the decoder 40. In operation, the drop element 42 either passes received cells on to its output, or it drops them, in dependence upon input, in the form of a drop signal, from the decoder 40. The decoder 40 receives flow control messages 200 from the TFC 100 and stores them according to the P field 206 of the flow control message 200. This can be done in a number of ways, one of which is for the decoder 40 to have a register for each emission priority type, p0 to p3. The drop element 42 accesses the appropriate register based on the emission priority flow, p0 to p3, of the incoming cell and determines whether the cell should be dropped based on the value of the FCR and CCD fields stored in the register. The values of these fields that indicate a cell should be dropped were described above. In the case of the CCD field, the drop element 42 must access the appropriate bit of the CCD field, which bit depends upon whether the cell loss priority (CLP) of the cell is set to the value zero or one, in the case of an ATM cell. Other cell types may use a different number of bits or encoding to indicate loss priority, in which case corresponding encoding of the CCD field would be required. The drop element 42 performs selection and comparison functions, an implementation of which can be realized using logic gates in a manner known in the art.

Figure 13:
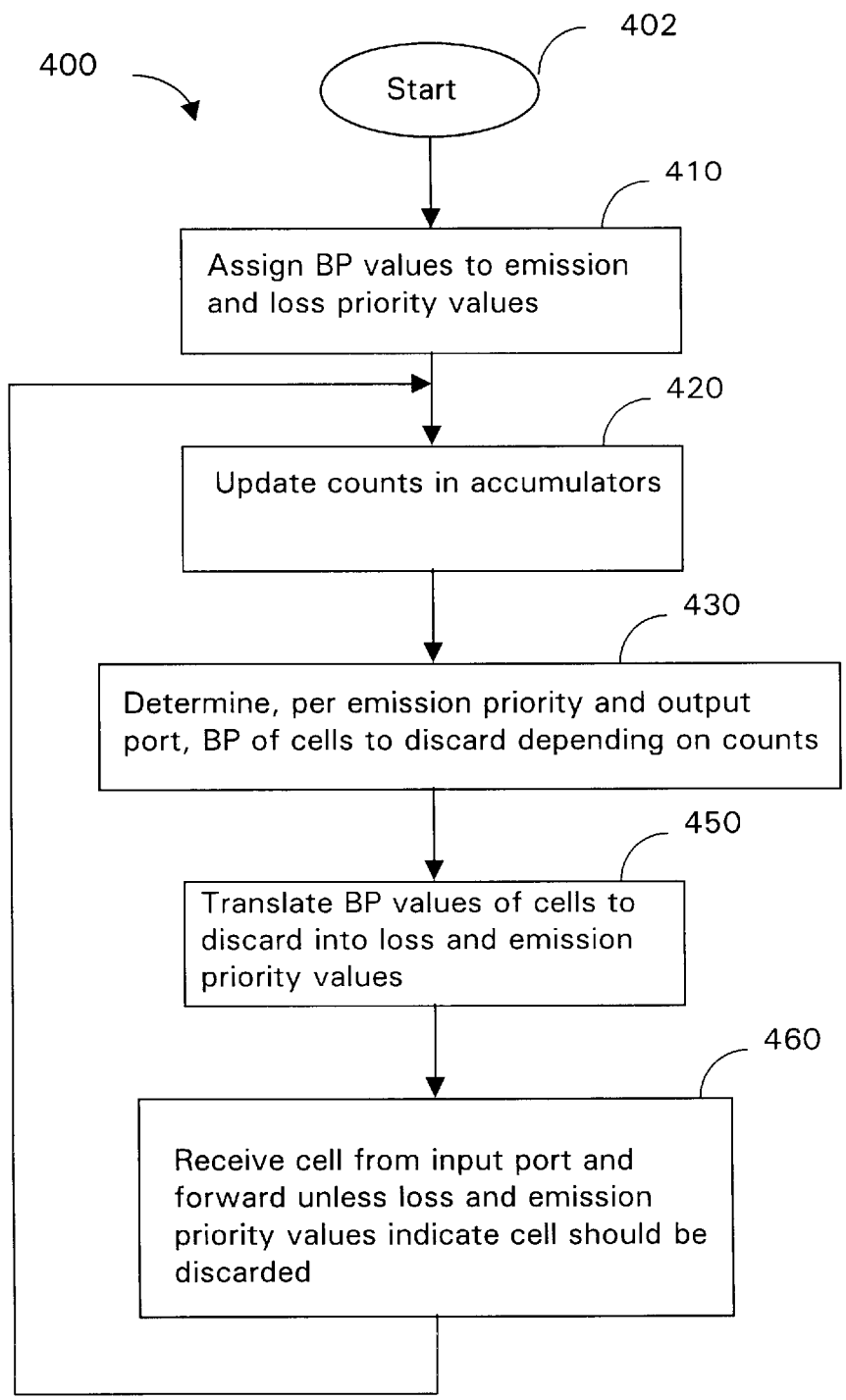
FIG. 13 is a flowchart of an embodiment of a method of traffic flow control in accordance with another aspect of the present invention.
Figure 14:
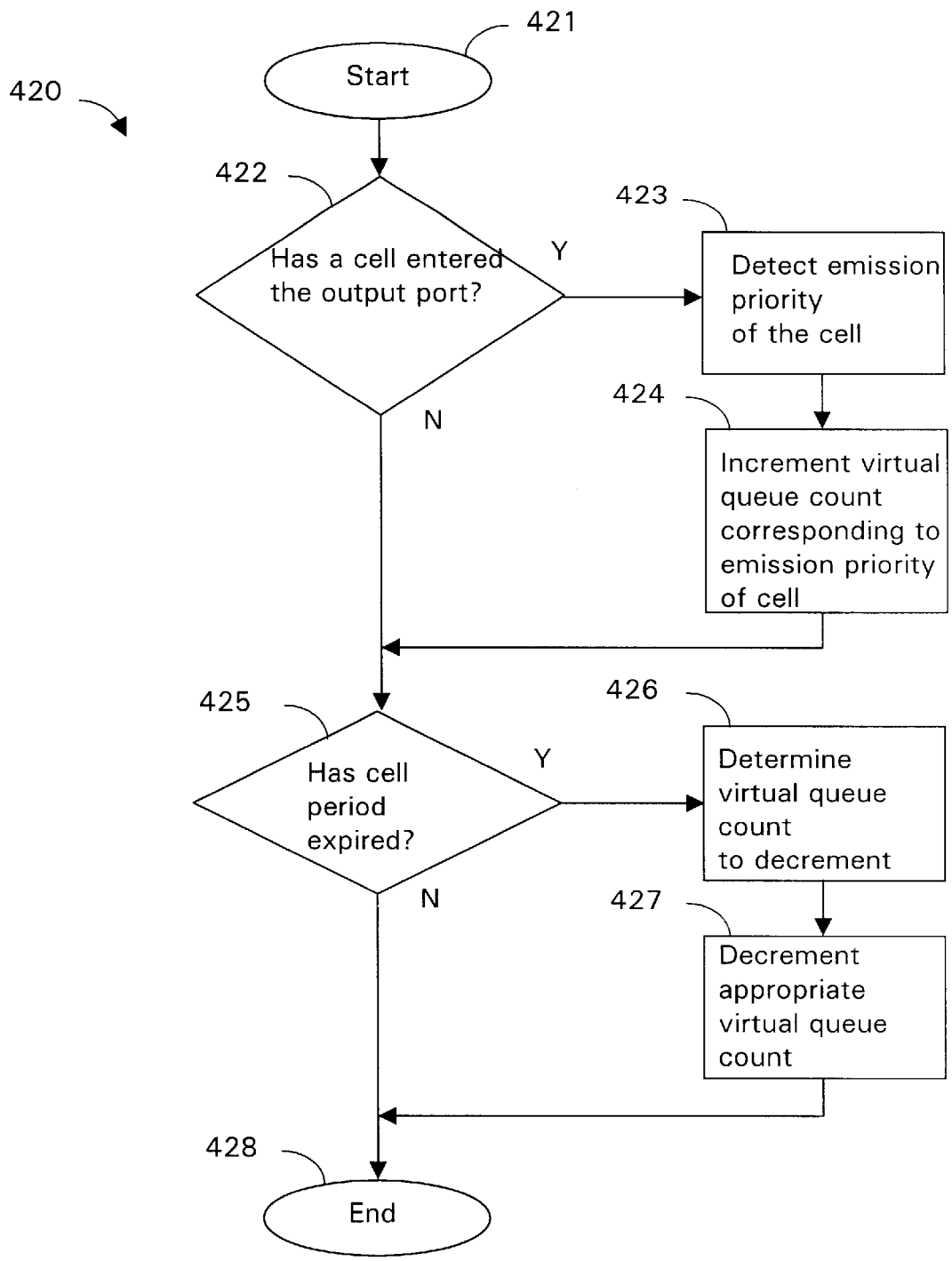
FIG. 14 is a flowchart providing more detail on the update step of FIG. 13.
Figure 15:
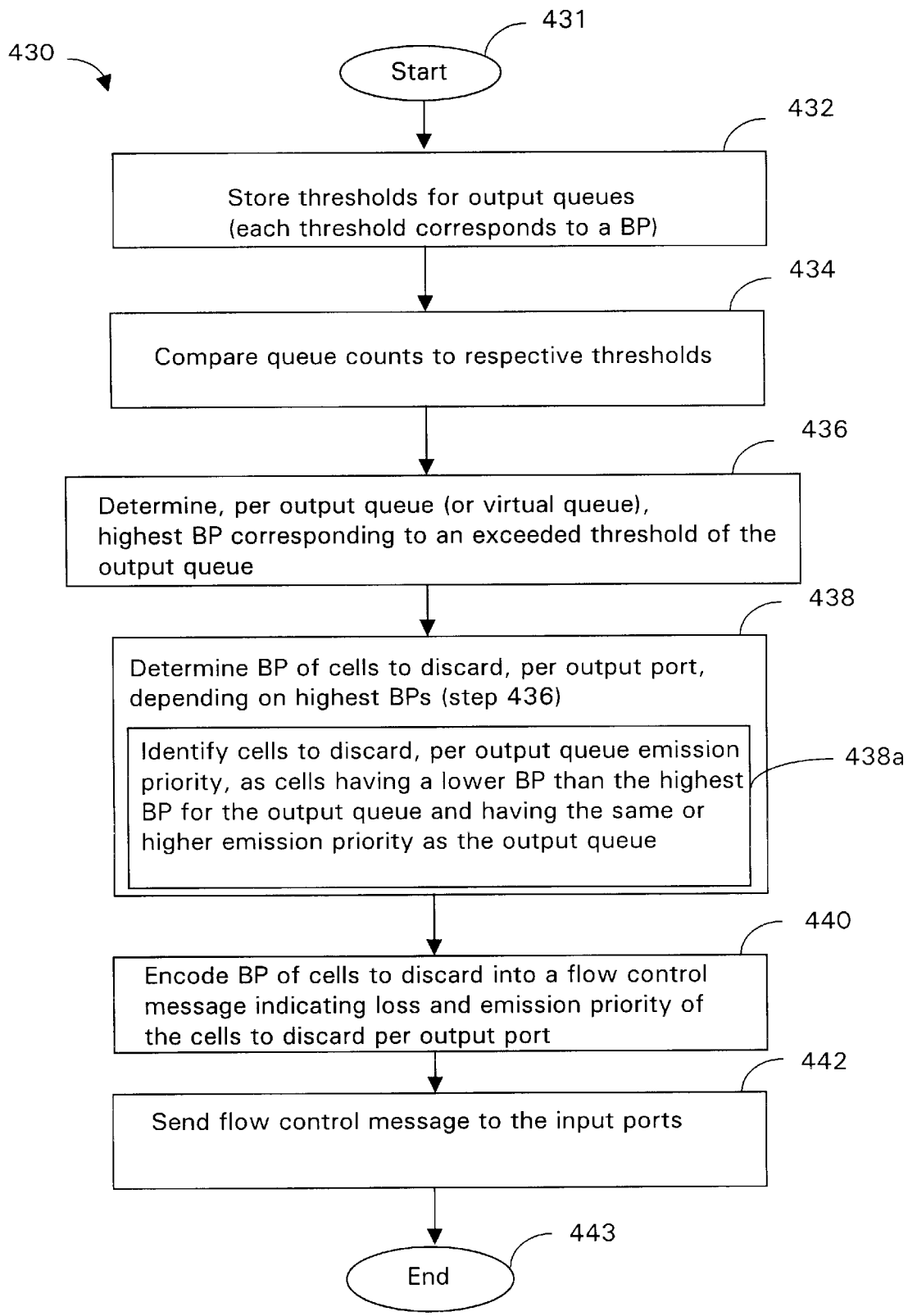
FIG. 15 is a flowchart providing more detail on the determination step of FIG. 13.

FIG. 13 is a flowchart of an embodiment 400 of a method of traffic flow control in accordance with another aspect of the present invention. FIGS. 13 to 15 are largely a generalization of the previous discussion with respect to FIGS. 10 to 12. After the start 402 of the method the next step is assigning 410 BP values to emission priorities and loss priority values. The result of this step 410 is the BP Matrix shown in Table 1, above. The next step is updating 420 counts of the accumulators 106. The details of this step 420 were described previously in connection with FIG. 12, and will be further described later. The result of this step is depicted in FIG. 10. The next step is determining 430, for each emission priority of each output port, the BP values of cells that should be discarded, or dropped. The outcome of this determination depends on the accumulator counts. The details of this step 430 were described previously in connection with FIG. 12, and will be further described later. The next step is translating 450 BP values to discard into loss priority and emission priority. This step 450 is performed with reference to the BP Matrix of Table 1. By looking up the row in the BP Matrix for the current emission priority and the cell containing the BP value(s) to discard, the loss priority value(s) are obtained. The result of this step 450 is shown in the shaded area of Table 2, above. The final step is receiving 460 a cell from on of the input ports, 14a to 14m, of the switch and forwarding that cell further into the switch 10, unless the loss priority value and emission priority of the cell indicate that it should be discarded. The method 400 then continues from the updating step 420.

FIG. 14 is a flowchart providing more detail on the update step 420 of FIG. 13. After the start 421 of the updating step 420, the next step is determining 422 whether or not a cell has entered the output buffer 24 of the output port 16a. This step 422 is performed by the cell tap 26 of FIG. 3. In response to detecting a cell entering the output buffer 24 of the output port 16a, the next step is detecting 423 the emission priority of the cell. This step 423 is also performed by the cell tap 26. After the priority of the cell has been determined, the next step is incrementing 424, by one, the virtual queue count, VP0 to VP3, corresponding to the emission priority of the cell. This step 424 is performed by the incrementor 142 of FIG. 8, or the processor 152 of FIG. 9. The next step is determining 425 if the cell period has expired, and is performed whether or not a cell has been detected entering the output port by the step 422. The step 425 is performed by the timer 146 of FIG. 8, or the processor 152 of FIG. 9. In response to the cell period having expired, the next step is determining 426 the emission priority of the virtual queue count, VP0 to VP3, to decrement. This step 426 is performed by the scheduler 148 of FIG. 11, or the processor 152 of FIG. 9. The next step is decrementing 427, by one, the appropriate virtual queue count, VP0 to VP3, determined by the scheduler 148. This step 427 is performed by the decrementor 144 of FIG. 8, or the processor 152 of FIG. 9. The updating step 420 ends at the next step 428 whether or not the line period was determined to have expired in the determining step 425.

FIG. 15 is a flowchart providing more detail on the determination step 430 of FIG. 13. After the start 431 of the determining step 430, the next step 432 is storing thresholds for the output queues OP0 to OP3, or rather, the virtual queues, VP0 to VP3, corresponding to the output queues OP0 to OP3. The next step is comparing 434 the counts in the virtual queues VP0 to VP3 to the thresholds for those queues. The next step is determining 436, for each output queue (or virtual queue), the highest BP corresponding to an exceeded threshold. These highest BPs are used in the next step 438 of determining, per output port, the BP of cells to discard. More specifically, in step 438a cells are identified as being cells to discard, if they have a BP lower than the highest BP corresponding to an exceeded threshold of the particular output queue, for the emission priority of the particular output queue and higher emission priorities. The BP of cells to discard is encoded into a flow control message in the next step 440. The flow control message indicates the loss and emission priority combinations of cells to discard. The flow control message is then sent to the input ports, 14a to 14m, in the next step 442, followed by step 443, which is the end of the step 430 of determining the BP of cells to discard.

Figure 16:
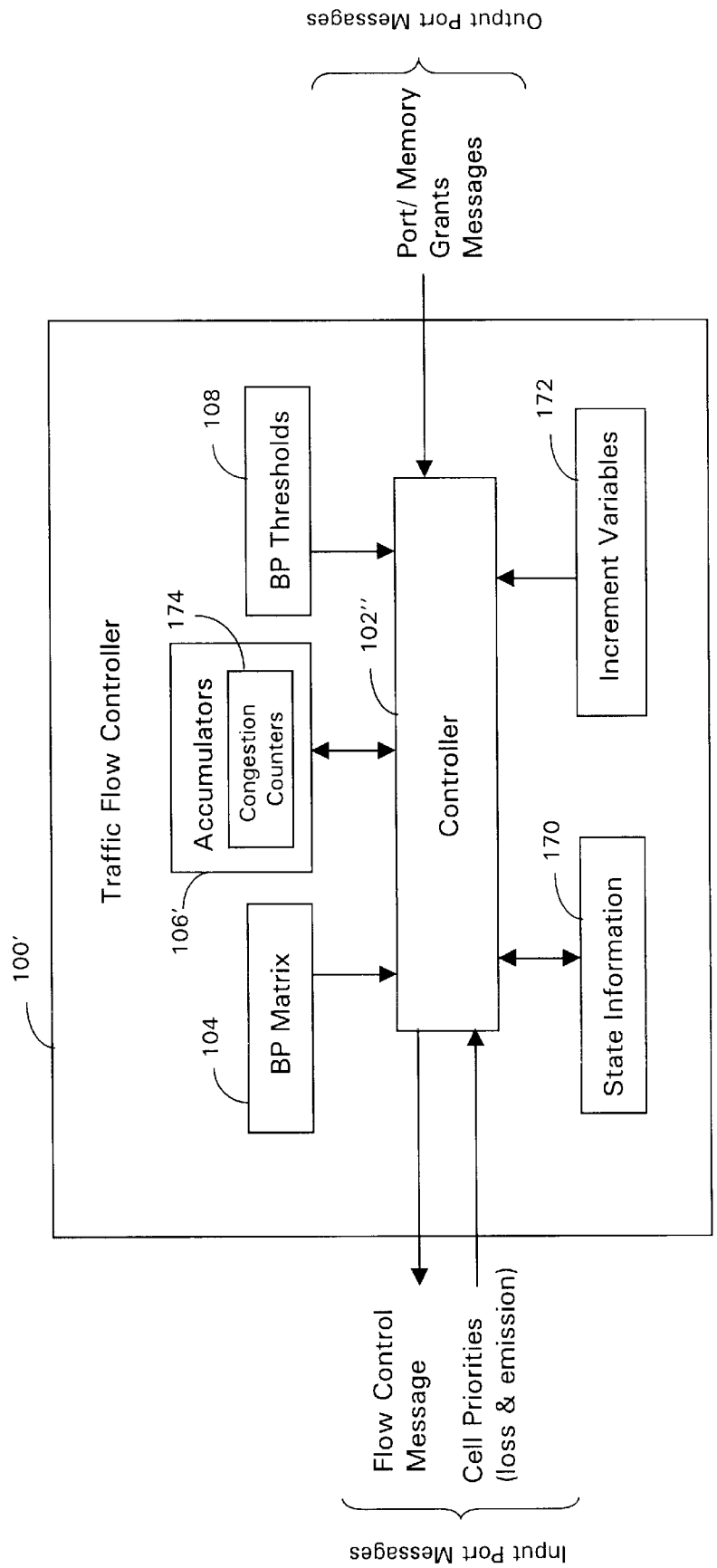
FIG. 16 is a functional block diagram showing a second embodiment of the traffic flow controller of FIG. 1.

FIG. 16 is a functional block diagram showing a second embodiment 100' of the TFC of FIG. 1. The TFC 100' has an additional input for receiving port/memory grant messages from the output buffers 24. The TFC 100' includes the same BP matrix 104 and BP thresholds 108 as the first embodiment of the TFC 100, but includes a second embodiment of the accumulators 106' and a third embodiment of the controller 102". The accumulators 106', coupled to the controller 102" in the same manner as in previous embodiments, include congestion counters 174, one congestion counter for each output port 16a to 16n. Hence there are N congestion counters 174 in total. The congestion counters 174 are for monitoring traffic congestion at the output ports of the switch 10, via port/memory grant messages received by the controller 102" from the output ports 16a to 16n. The TFC 100' further includes state information 170 and increment variables 172, both of which are stored in a memory, or register, and coupled to the controller 102". The state information 170 and increment variables 172 are used by the controller 102" to perform a second embodiment of a method of traffic flow control according to the another aspect of the present invention.

It should be noted that the BP Matrix 104, Accumulators 106', BP thresholds 108, state information 170 and increment variables 172 could be stored in a single memory, in which case the TFC 100' would consist of the single memory and the controller 102".

Figure 17:
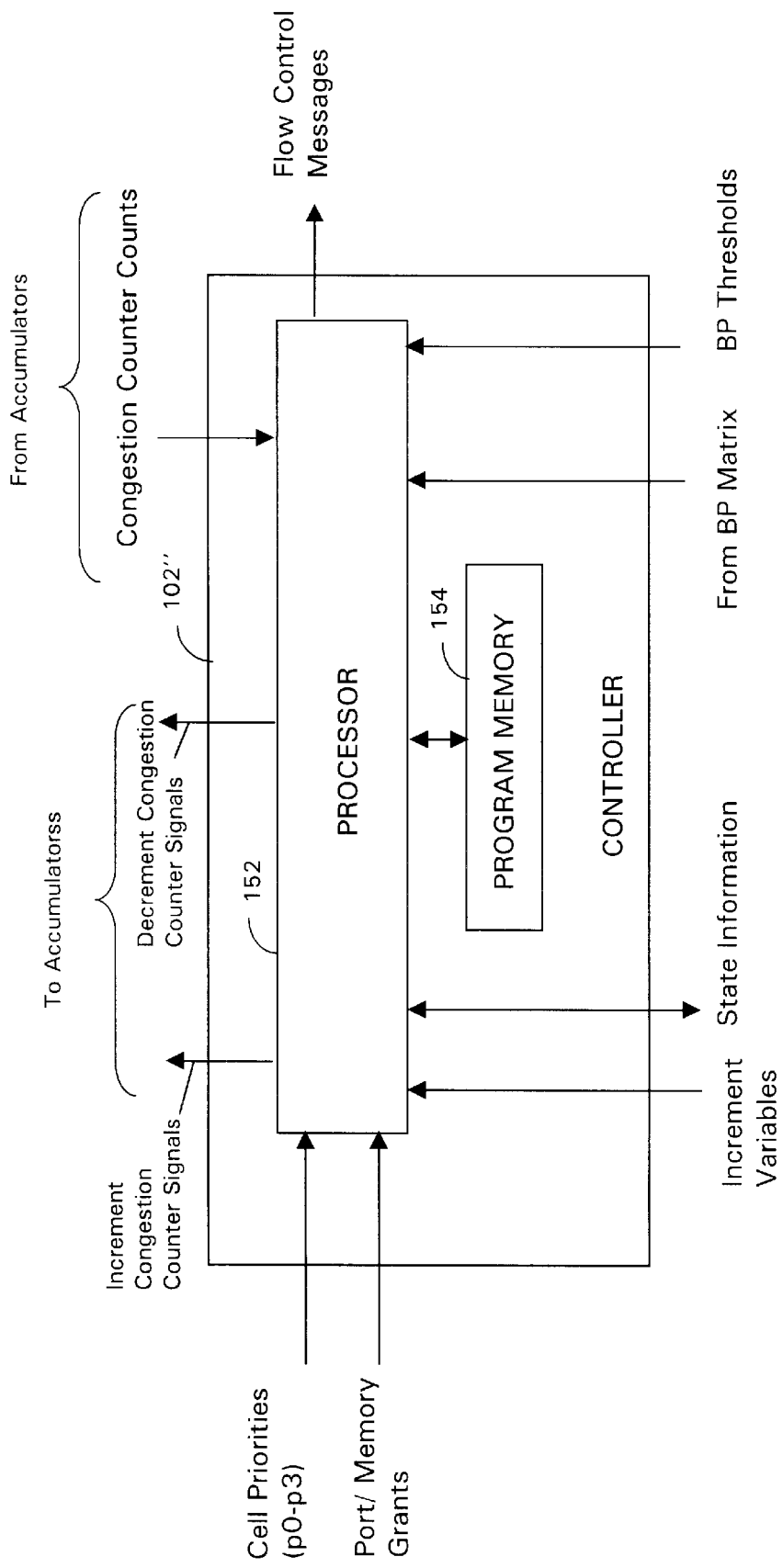
FIG. 17 is a functional block diagram of the controller of FIG. 16.

FIG. 17 is a functional block diagram of the controller 102" of FIG. 16. The controller 102" is similar to that the controller 102' of FIG. 9, but with additional inputs for increment variables 172, port/memory grant messages. The same processor 152 and memory 154 are included in the controller 102", however, a program to perform the second embodiment of the method of traffic flow control is contained in the memory. Further, the processor outputs increment congestion counter and decrement congestion counter messages, and inputs congestion counter counts, instead of corresponding messages to and from the virtual queues.

Figure 18:
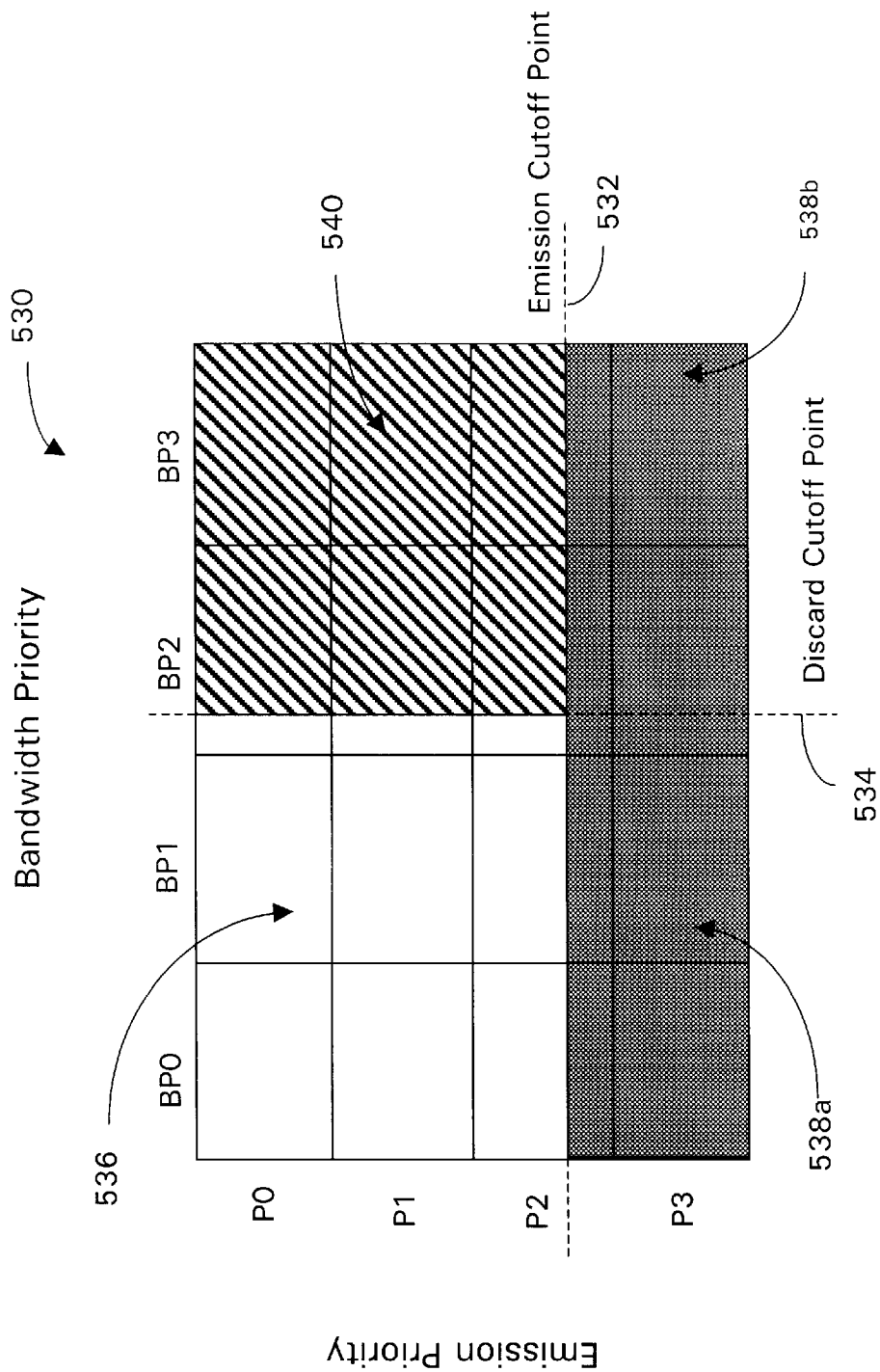
FIG. 18 is a diagram illustrating the traffic flow control resulting from embodiments of the present invention.

With reference to FIG. 18 and to a type of switch known in the art as a PRIZMA switch, the traffic flow control for a particular output port, 16a for example, resulting from operation of the TFC 100' of FIG. 16 will now be described. The traffic management paradigm that a PRIZMA switch provides includes four emission priorities, p0 to p3, of lossless queuing, flow control of the inputs, and a strict priority scheduler. Within each emission priority, four levels of loss priority CC0 to CC3, are defined. Each cell processed by the switch has an indication of the particular loss priority and emission priority assigned to the cell. The loss priority levels, CC0 to CC3, have a relationship to each other within an emission priority level, but do not have a relationship between different emission priorities. The loss priority level CC0 is the level representing the least preference to discarding while higher loss priority levels, CC1 to CC3, have progressively higher preferences to discarding. That is, if cells must be discarded, cells assigned the loss priority level CC3 will be discarded before those assigned the level CC2, and so on for levels CC1 and CC0.

Table 3 is an example BP Matrix showing the assignment of BP levels for the four emission priority levels, p0 to p3, and the corresponding loss priority levels, CC0 to CC3, within each of these levels. By assigning BP levels in this way, one discard priority relationship, represented by the assigned BP levels, is established for the various emission and loss priority levels as a whole. This is true for any particular assignment of BP levels, and was also the case for the BP assignment defined previously in table 1.

TABLE 3

BP assignment to emission and loss priority levels

|  | CC0 | CC1 | CC2 | CC3 |
|---|---|---|---|---|
| P0 | BP0 | BP0 | BP1 | BP2 |
| P1 | BP0 | BP1 | BP2 | BP3 |
| P2 | BP1 | BP2 | BP3 | BP3 |
| P3 | BP2 | BP3 | BP3 | BP3 |

In FIG. 18 a table 530 shows the results of operation of the TFC 100' of FIG. 16. The whole of the area of the table 530 represents the entire spectrum of traffic load, in terms of emission priority and bandwidth priority of cells that can arrive at the switch for switching. An emission cut-off point 532 for emission priority is shown as a dashed horizontal line. A discard cut-off point 534 for bandwidth priority is shown as a dashed vertical line. The area to the left of the discard cut-off point 534 and above the emission cut-off point 532 represents the amount of permitted load 536. This is the amount of traffic egressing from the output port 16a. The area below the emission cut-off point 432 represents the amount back-pressured load 538a and 538b. This is the amount of traffic queued in the input buffer 20a, of each input port, 14a to 14m. The area to the right of the discard cut-off point 534 and above the emission cut-off point 532 is the amount of discarded load 540. This is the traffic that is dropped by the discarders 38a of each input port, 14a to 14m.

The PRIZMA flow control scheme used by the switch moves the emission cut-off point 532 so that permitted load matches the capacity of the output ports, 16a to 16n. At any given instant in time the emission cut-off point 532 can only exist at segment boundaries, that is the boundaries between the rows of the table 530. However, an average intermediate position, as shown in FIG. 18, is achieved by moving the emission point 532 back and forth between two adjacent segment boundaries, with an appropriate duty cycle. Likewise, the discard cut-off point 534 moves between column boundaries, and can only be at any one boundary at any given point in time, however, on average it may attain an intermediate position between boundaries, as shown in the figure. In this embodiment the area 538b that is both below the emission cut-off point 532 and to the right of the discard cut-off point 534 is load back-pressured in the input buffer 20a of each of the input ports, 14a to 14m. However, this bask-pressured load could instead be discarded if desired.

The second embodiment of the method of flow control, hereinafter referred to as TFC flow control, adjusts the discard cut-off point 534, in an effort to alleviate quality of service problems (QOS) manifesting themselves at the input ports, 14a to 14m. Typically, the switching core 12 of a PRIZMA switch has relatively small buffers in comparison to the input buffers, 20a to 20n, and the PRIZMA flow control scheme reacts quickly relative to the TFC method of flow control.

With reference to FIGS. 20 to 23 the TFC method of traffic flow control will now be described in further detail. The TFC method of traffic flow control has the same steps shown in FIG. 13, however the implementation of the steps of updating 420 and determining 430 is different. The new implementation of these steps is shown as updating 420' and determining 430' in FIG. 19 and FIG. 22, respectively.

Figure 19:
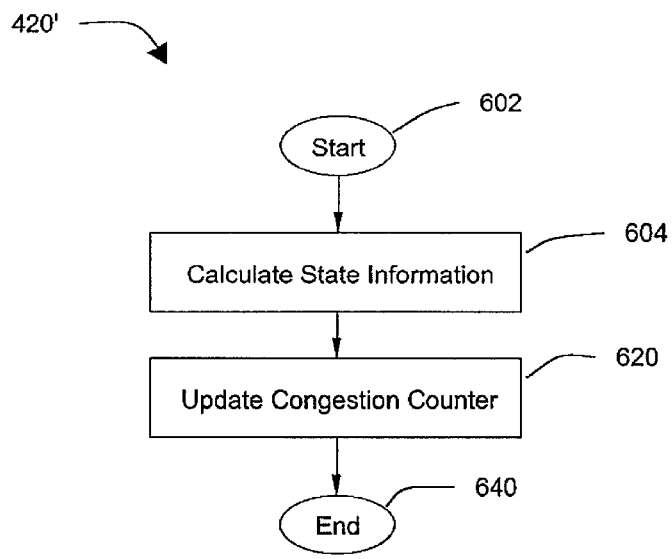
FIG. 19 is a flowchart of a second embodiment of the update step of FIG. 13.

FIG. 19 shows the step of updating 420' in greater detail. After the start 602 the next step is calculating 604 the state information 170. The state information 170 includes five state variables, they are: Highest Congested Priority (HCP), Highest Congested Priority Envelope (HCPE), HCPE tire to live (HCPE_TTL), No Congestion Long Term (NCLT), and NCLT time to live (NCLT_TTL). The next step is updating the congestion counter 620 and then ending at step 640.

Figure 20:
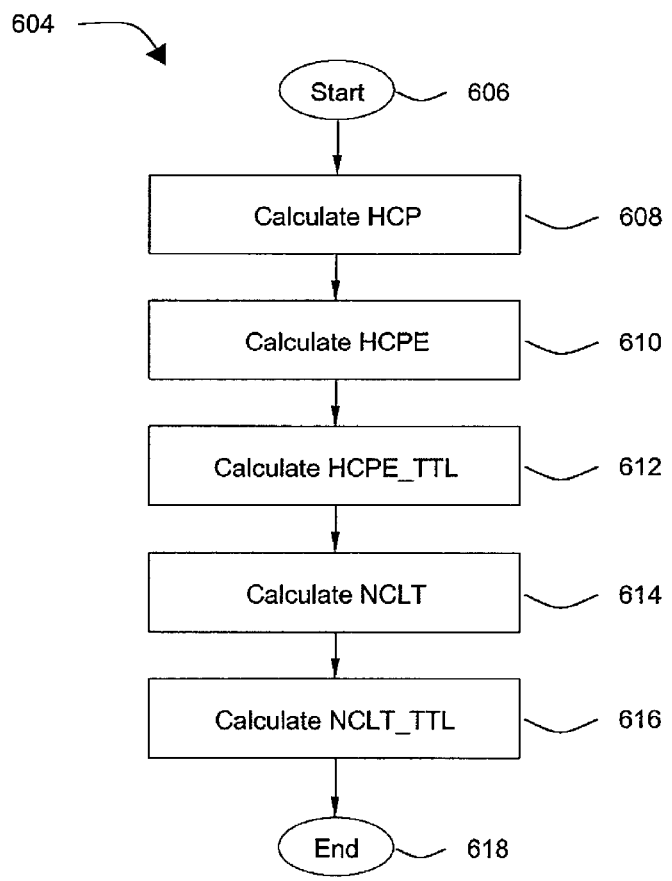
FIG. 20 is a flowchart of the calculation step of FIG. 19.

FIG. 20 shows the step of calculating 604 the state information 170 in greater detail. After the start 606 the next step is calculating 608 the HCP, followed by the step of calculating 610 the HCPE. The next step is calculating 612 the HCPE_TTL, followed by the step of calculating 614 the NCLT. The next step is calculating 616 the NCLT_TTL, and then ending at step 618. The above steps are explained in more detail below.

The step of calculating 608 the HCP will now be explained with reference to pseudo code. HCP stands for Highest Congestion Priority. HCP is the number of the highest emission priority without a port/memory grant. If all emission priorities have grants, it is a special value, NO_CONG. It is computed per port by examining the grants, as shown in the following pseudo code. The code makes use of 2 functions. PRI_ENCODE is passed a vector (i.e. PORT_GRANTS[PORT]) of 4 grants and returns the number of the highest priority with no grant. If all grants are present, it returns NO_CONG. MIN simply returns the numerical minimum of its arguments. X is a temporary variable.

The pseudo code for HCP is as follows:

```
int PRI_ENCODE(G0,G1,G2,G3) {
    if (G0 == 0)
        return(0);
    else if (G1 == 0)
        return(1);
    else if (G2 == 0)
        return(2);
    else if (G3 == 0)
        return(3);
    else
        return(NO_CONG);
}
HCP = NO_CONG;
X = PRI_ENCODE(PORT_GRANTS[PORT]);
HCP = MIN(HCP,X);
```

The steps of calculating 610 the HCPE and calculating 612 the HCPE_TTL will now be explained with reference to pseudo code. HCPE stands for Highest Congested Priority Envelope and TTL stands for Time To Live. HCPE is computed per port by computing the envelope of the HCP for that port. The envelope is one that will track any upward (numerically downward) changes in HCP immediately, while filtering out transient downward (numerically upward) changes. This involves a stored HCPE value for each port, a time-to-live count, HCPE_TTL (6 bits), for each port, and a global time-to-live value, HCPE_TTL_VALUE (6 bits). For each port, the HCP is compared to the HCPE. If HCP is greater or equal (less than or equal, numerically) to HCPE, then HCPE is set to HCP and HCPE_TTL is set to HCPE_TTL_VALUE. Otherwise, HCPE_TTL is retrieved and tested. If it has reached zero, HCPE is set to HCP and HCPE_TTL is set to HCPE_TTL_VALUE. Otherwise, HCPE_TTL is decremented.

The pseudo code for HCPE and HCPE_TTL is as follows (relations are in the numeric sense):

```
if (HCP[PORT] <= HCPE[PORT]) {
    HCPE[PORT] = HCP[PORT];
    HCPE_TTL[PORT] = HCPE_TTL_VALUE;
}
else {
    if (HCPE_TTL[PORT] == 0) {
        HCPE[PORT] = HCP[PORT];
        HCPE_TTL[PORT] = HCPE_TTL_VALUE;
    }
    else
        HCPE_TTL[PORT] = HCPE_TTL[PORT]-1;
}
```

The steps of calculating 614 the NCLT and calculating 616 the NCLT_TTL will now be explained with reference to pseudo code. NCLT stands for No Congestion Long Term and TTL stands for Time To Live. NCLT is computed per port by computing the envelope of HCPE==NO_CONG for that port. Hence it is a binary indication. The envelope is one that will track any indications of congestion immediately, while filtering out transient periods of no congestion. This involves a stored NCLT value for each port, a time-to-live count, NCLT_TTL (8 bits), for each port, and a global time-to-live value, NCLT_TTL_VALUE (8 bits). For each port, the HCPE is compared to NO_CONG. If they are not equal, then NCLT is set to 0 and NCLT_TTL is set to NCLT_TTL_VALUE. Otherwise, NCLT_TTL is retrieved and tested. If it has reached zero, NCLT is set to 1. Otherwise, NCLT_TTL is decremented.

The pseudo code for NCLT and NCLT_TTL is as follows:

```
if (HCPE[PORT]! = NO_CONG) {
    NCLT[PORT] = 0;
    NCLT_TTL[PORT] = NCLT_TTL_VALUE;
    }
else {
    if (NCLT_TTL[PORT] == 0)
        NCLT[PORT] = 1;
    else
        NCLT_TTL[PORT] = NCLT_TTL[PORT]-1;
    }
```

Figure 21:
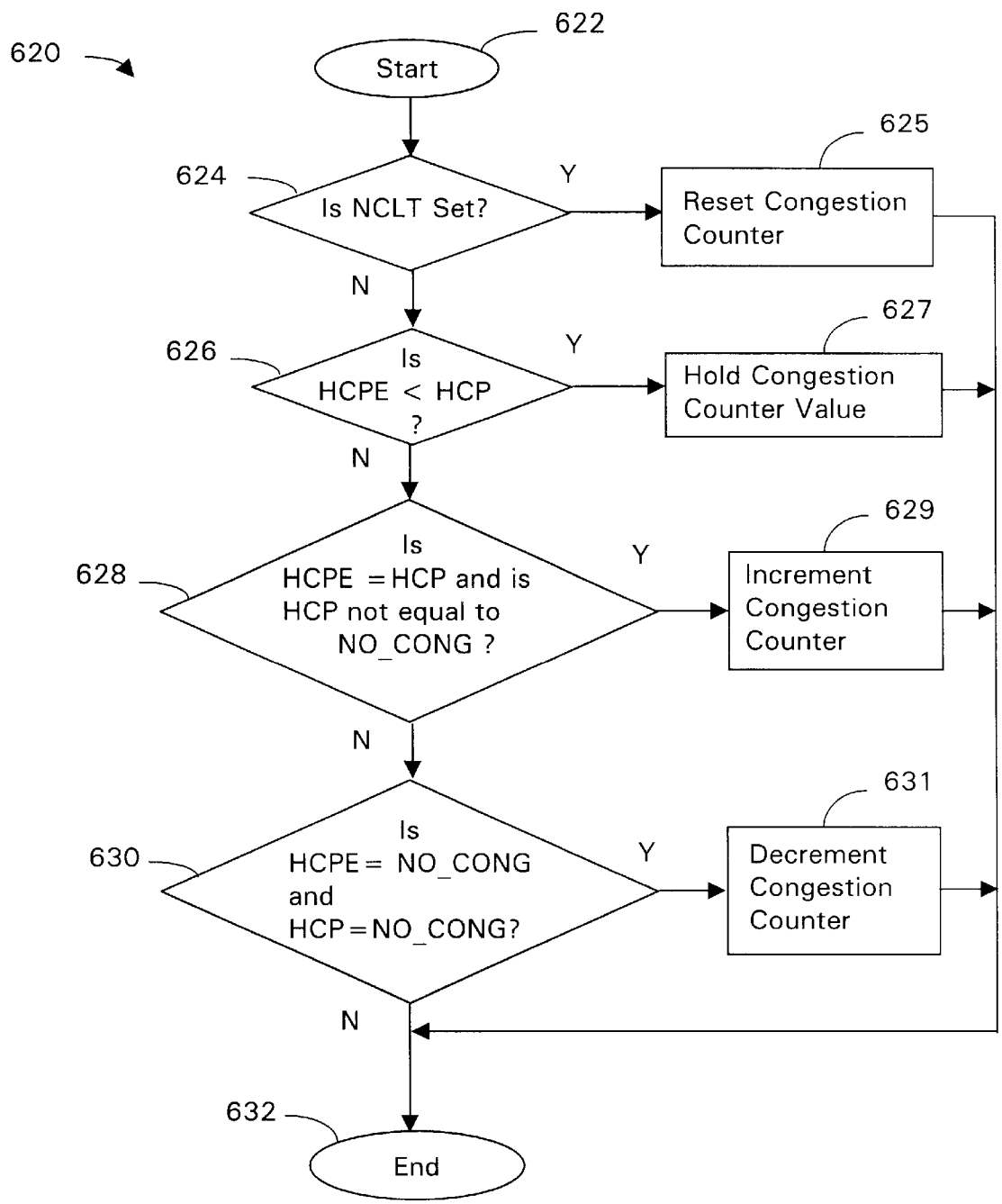
FIG. 21 is a flowchart of the update step of FIG. 19.

FIG. 21 shows the step of updating 620 a congestion counter 174 in greater detail. This step 620 is repeated for each congestion counter. The counters per emulated port must be large enough to provide a delay in reacting commensurate with the time it may take for the port adapter, with large buffers, to begin violating QOS due to fabric congestion and backpressure. The counters are 20 bits. The required counter operations are:

1. increment by INCREMENT[HCP] (do not wrap)
2. hold current value—decrement by 1 (do not wrap)
3. reset to 0

The step of updating 620 the congestion counter starts at step 622 which is followed by the step of determining 624 whether the NCLT is set. In response to the NCLT being set the next step is resetting 625 the congestion counter. After this resetting step 625 the step of updating 620 ends at step 632. In response to the NCLT not being set the next step is determining 626 whether the HCPE is less than the HCP. In response to the HCPE being less than the HCP the next step is holding 627 the value of the congestion counter. This step of holding is followed by the step of ending 632. In response to the HCPE not being less than the HCP, the next step is determining 628 whether or not the HCPE equals HCP and HCP does not equal NO_CONG. In response to this determining 628 step being answered in the affirmative, the next step is incrementing 629 the congestion counter by an amount given by the INCREMENT array indexed by the value of HCP. This step of incrementing is followed by the step of ending 632. In response to the determining 628 step being answered in the negative, the next step is determining 630 whether or not the HCPE equals NO_CONG and HCP equals NO_CONG. In response to this step of determining 630 being answered in the affirmative the next step is decrementing 631 the congestion counter by one. This step of decrementing 631 is followed by the step of ending 632. In response to the step of determining 630 being answered in the negative, the next step is ending 632.

The state in which each operation,is triggered is given in table 4, below, with reference to the step numbers shown in FIG. 25 for the steps of determining the state and the steps for performing the operations on the congestion counter. The actual sequence of the steps for determining the state, 624, 626, 628, and 630, can be performed in any order. What is required is that the step for performing an operation, 625, 627, 629, and 631, follow the corresponding step for determining the state. The step of updating 620 the congestion counter starts at step 622 and end at step 632, the intervening steps are shown in table 4, below.

TABLE 4

Congestion Counter Behaviour

| State | Counter Behaviour |
|---|---|
| (HCPE == HCP)&&(HCP! = NO_CONG) Determined in step 628 | increment by INCREMENT [HCP], no wrap Executed in step 629 |
| (HCPE < HCP) Determined in step 626 | hold Executed in step 627 |
| (HCPE == NO_CONG)&&(HCP == NO_CONG) Determined in step 630 | decrement by 1, no wrap Executed in step 631 |
| NCLT Set Determined in step 624 | reset Executed in step 625 |

Figure 22:
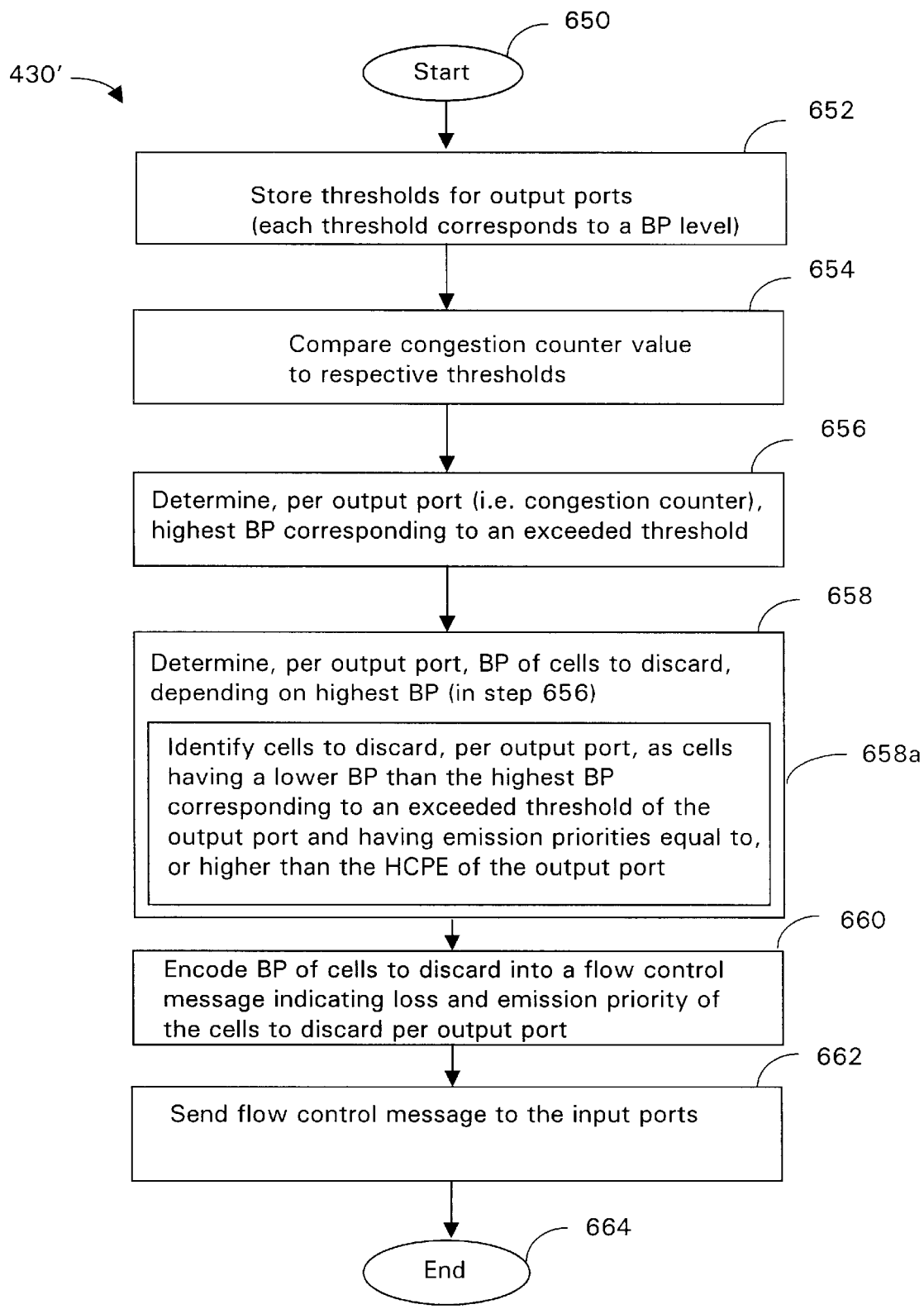
FIG. 22 is a flowchart of a second embodiment of the determination step of FIG. 13.

FIG. 22 shows in greater detail the step of determining 430' the BP values of cells to discard. This step 430' is performed at for each congestion counter. After the start 650 the next step 652 is storing thresholds for the output ports, 16a to 16n. The next step 654 is comparing, per output port, the counts in the congestion counters to the thresholds for the respective output port. The next step is determining 656, for each output port, the highest BP corresponding to an exceeded threshold. These highest BPs are used in the next step 658 of determining, per output port, the BP of cells to discard. In step 658a cells to be discarded are identified as those having a BP lower than the highest BP for the output port, and having an emission priority equal to, or higher than the HCPE for the out put port. The BP of cells to discard is encoded into a flow control message in the next step 660. The flow control message indicates the loss and emission priority combinations of cells to discard. The flow control message is then sent to the input ports, 14a to 14m, in the next step 662, followed by step 664, which is the end of the step 430' of determining the BP of cells to discard.

The step of comparing 654 will now be further described with reference to pseudo code. There are 3 global thresholds, BPT0, BPT1, and BPT2. They are compared to the counter to determine the congestion state, BPL (Bandwidth Priority Level). The comparison is strictly less than so that a threshold equal to the counter's maximum value (FFFFF hex) effectively disables that threshold.

The pseudo code is as follows:

```
if (BPT0 < COUNTER[PORT])
    BPL = 0
else if (BPT1 < COUNTER[PORT])
    BPL = 1
else if (BPT2 < COUNTER[PORT])
    BPL = 2
else
    BPL = 3
```

The steps of determining 656, 658 will now be described with reference to pseudo code. Each arriving cell has its BP (Bandwidth Priority) determined from a simple lookup operation from the BP matrix using its assigned priority and CC values as indices. The discard function determines for which priorities and BP values cells will be admitted or discarded. It discards cells that have a BP lower (numerically higher) than the BPL, and are also of an emission priority equal to or higher (numerically equal or lower) than HCPE. It is not possible to discard BP=0 cells. There is a 1-bit discard count (i.e. a flag) for each combination of priority and BP for each port. When a cell is discarded, the appropriate flag is set to 1 to provide visibility of where TFC has discarded cells. When the processor reads flags, they are reset to 0. The pseudo-code to describe cell discarding and admission is as follows.

```
BP = BP_MATRIX[CELL_PRIORITY][CELL_CC];
if ((BP>BPL) && (CELL_PRIORITY <= HCPE)) {
    discard cell;
    DISCARD_FLAGS[PORT][CELL_PRIORITY][BP] = 1;
    }
else
    admit cell;
```

Figure 23:
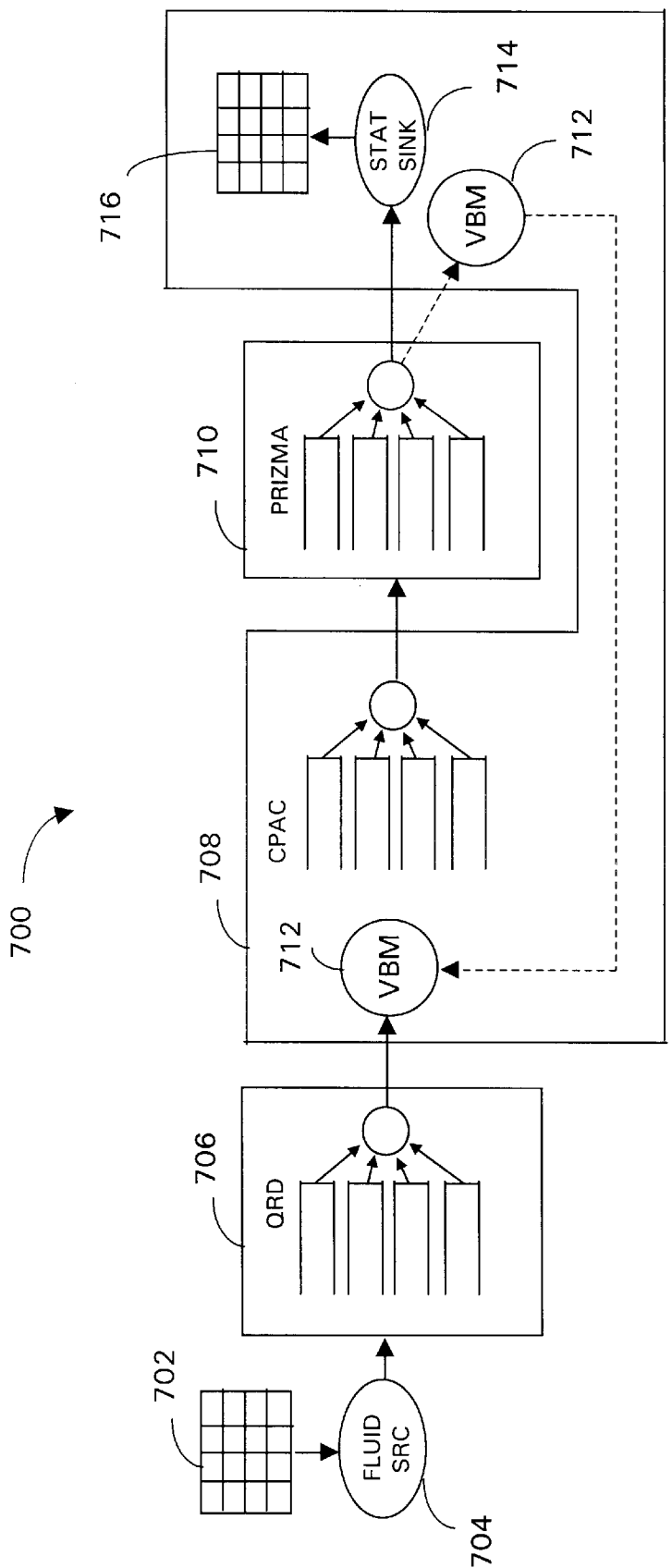
FIG. 23 is functional block diagram of a model used to simulate the traffic flow controller of FIG. 16.

FIG. 23 is functional block diagram of a simulation model 700 used to simulate the apparatus of FIG. 19. The traffic source 702, generates fluid (i.e. non-bursty) traffic 704 with a simple timer for each combination of emission priority and CC. Cells are passed from the source 702 to QRD 706 and tested for admission eligibility by comparing the queue count against the threshold for the cell's CC value.

The QRD 706 respects flow control from the CPAC 708 and serves its eligible queues by strict priority. The cell is transferred to the CPAC 708. The CPAC 708 then determines the cell's BP and whether or not it should discard the cell. Discarded cells are counted in statistics. Admitted cells are enqueued in the appropriate queue. The flow control back to the QRD 706 is done with respect to a small threshold on each CPAC queue.

The CPAC 708 respects flow control from the PRIZMA 710 and serves its eligible queue by strict priority. The cell is transferred to the PRIZMA 710 which enqueues the cell. Congestion in the PRIZMA 710 can be created by permitting a slow-than-normal egress cell rate to be specified. Thus with a sufficiently high traffic load and ingress cell rate, cells will back up in the PRIZMA 710. The flow control back to the CPAC 708 is done with respect to the total count of the four emission priority queues for the port. Memory grants are not implemented.

The port grants are fed to the CPAC 708 with a small configurable latency, and sampled by the TFC 712 process. The PRIZMA 710 serves its queues in strict priority and transfers a cell to the egress CPAC 708, where a statistics link 714 communicates output statistics 716, which are stored for the simulation.

Simulation Results

Actual output from the simulation is shown in fixed-width Courier font, as shown immediately following.

| INGRESS CELL TIME: | 1.000 |
|---|---|
| EGRESS CELL TIME: | 2.000 (50.0% of ingress capacity) |
| TFC UPDATE TIME: | 4.000 |

This indicates that the egress path (PRIZMA to CPAC) can only run half as fast as the ingress path, thus ensuring we can generate congestion. It also shows that TFC only samples the grants every 4 ingress cell times.

The following matrix shows how the BP values are assigned for each combination of emission priority and CC level.

| BP MATRIX | | | | |
|---|---|---|---|---|
| | CC0 | CC1 | CC2 | CC3 |
| P0 | 0 | 0 | 1 | 2 |
| P1 | 0 | 1 | 2 | 3 |
| P2 | 1 | 2 | 3 | 3 |
| P3 | 2 | 3 | 3 | 3 |

The next matrix shows the distribution of the traffic.

| SRC TRAFFIC PROFILE BY CC (% of ingress capacity) | | | | |
|---|---|---|---|---|
| | CC0 | CC1 | CC2 | CC3 |
| P0 | 5.0 | 5.0 | 10.0 | 10.0 |
| P1 | 5.0 | 10.0 | 5.0 | 5.0 |
| P2 | 10.0 | 5.0 | 5.0 | 5.0 |
| P3 | 5.0 | 5.0 | 5.0 | 5.0 |

Since the entries add up to 100% of ingress capacity, this can overload the PRIZMA port by a 2:1 ratio. It is useful to also calculate the traffic distribution according to BP instead of CC, since BP is the dimension that TFC naturally operates on.

| SRC TRAFFIC PROFILE BY BP (% of ingress capacity) | | | | |
|---|---|---|---|---|
| | BP0 | BP1 | BP2 | BP3 |
| P0 | 10.0 | 10.0 | 10.0 | 0.0 |
| P1 | 5.0 | 10.0 | 5.0 | 5.0 |
| P2 | 0.0 | 10.0 | 5.0 | 10.0 |
| P3 | 0.0 | 0.0 | 5.0 | 15.0 |

We see that BP0 and BP1 combine to provide a 45% load, while including BP2 brings the load to 70%. We anticipate TFC will allow only 5 of the 25% in BP2, matching the admitted load to the 50% egress port capacity. Effectively none of the BP3 traffic should get through. We also specify the following TFC parameters, noting that they give TFC a sufficiently long reaction time so that the PRIZMA flow control scheme will dominate. In a typical application, the thresholds would likely be even larger, further reinforcing this characteristic.

COUNTER INCREMENTS: P0 4 P1 3 P2 2 P3 1
BP THRESHOLDS: BPT0 500 BPT1 200 BPT2 50
Various other details are specified.
QRD BUFFER SIZES: P0 1000 P1 1000 P2 1000 P3 1000
CPAC FLOW CTRL THRESHOLD: 4 cells
PRIZMA FLOW CTRL THRESHOLDS: P0 40 P1 30 P2 20 P3 10
The simulation is run for a long time to push the effect of the warm-up period and residual cells to well below 1% of the total cells.
SIMULATION LENGTH (ingress cell times): 100000.0
SRC CELLS GENERATED: 99998
The queue sizes at the end of the simulation reveal very little congestion, and suggest minimal blocking due to flow control.

| FINAL QUEUE SIZES | | | | | | | | |
|---|---|---|---|---|---|---|---|---|
| QRD: | P0 | 0 | P1 | 1 | P2 | 0 | P3 | 286 |
| CPAC: | P0 | 0 | P1 | 0 | P2 | 0 | P3 | 2 |
| PRIZMA: | P0 | 0 | P1 | 1 | P2 | 9 | P3 | 2 |
| TOTAL 301 cells, 0.3% | | | | | | | | |

The next matrix shows the number of cells received from the PRIZMA for each emission and bandwidth priority combination. The absolute number is given, as well as a percentage of the ingress cell times in the simulation.

| OUTPUT RX'D BY BP (cells/%) | | | | |
|---|---|---|---|---|
| | BP0 | BP1 | BP2 | BP3 |
| P0 | 10000/10.0 | 9990/10.0 | 1826/1.8 | 0/0.0 |
| P1 | 5000/5.0 | 9989/10.0 | 913/0.9 | 7/0.0 |
| P2 | 0/0.0 | 9981/10.0 | 893/0.9 | 8/0.0 |
| P3 | 0/0.0 | 0/0.0 | 888/0.9 | 6/0.0 |
| TOTAL 49501 cells, 49.5% | | | | |

We see that the total (49.5%) closely matches the egress capacity and that all of the BP0 and BP1 load made it through, while none of the BP3 load did. As expected, a portion of the BP2 traffic made it through, and note that it was spread across emission priorities in direct proportion to the offered loads (10%, 5%, 5%, and 5%).

The next matrix, showing the discard statistics, is essentially redundant information but is included for completeness.

| DISCARDS BY BP (cells/%) | | | | |
|---|---|---|---|---|
| | BP0 | BP1 | BP2 | BP3 |
| P0 | 0/0.0 | 10/0.0 | 8174/8.2 | 0/0.0 |
| P1 | 0/0.0 | 10/0.0 | 4087/4.1 | 4993/5.0 |
| P2 | 0/0.0 | 10/0.0 | 4106/4.1 | 9992/10.0 |
| P3 | 0/0.0 | 0/0.0 | 4036/4.0 | 14778/14.8 |
| TOTAL 50196 cells, 50.2% | | | | |

And finally, here are the output and discard matrices arranged by CC value.

| | CC0 | CC1 | CC2 | CC3 |
|---|---|---|---|---|
| OUTPUT RX'D BY CC (cells/%) | | | | |
| P0 | 5000/5.0 | 5000/5.0 | 9990/10.0 | 1826/1.8 |
| P1 | 5000/5.0 | 9989/10.0 | 913 0.9 | 7/0.0 |
| P2 | 9981/10.0 | 893/0.9 | 4/0.0 | 4/0.0 |
| P3 | 888/0.9 | 2/0.0 | 2/0.0 | 2/0.0 |
| TOTAL 49501 cells, 49.5% | | | | |
| DISCARDS BY CC (cells/%) | | | | |
| P0 | 0/0.0 | 0/0.0 | 10/0.0 | 8174/8.2 |
| P1 | 0/0.0 | 10/0.0 | 4087/4.1 | 4993/5.0 |
| P2 | 10/0.0 | 4106/4.1 | 4996/5.0 | 4996/5.0 |
| P3 | 4036/4.0 | 4926/4.9 | 4926/4.9 | 4926/4.9 |
| TOTAL 50196 cells, 50.2% | | | | |

Numerous modifications, variations, and adaptations may be made to the particular embodiments of the invention described above without departing from the scope of the invention, which is defined in the claims.

What is claimed is:

1. A data switch for switching data traffic in the form of cells, each cell having an indication of loss priority and emission priority of the cell, the data switch comprising:

a plurality of input ports, each input port being operable to either forward or discard a cell in dependence upon a flow control message received at the input port;

a switching fabric having multiple fabric inputs and multiple fabric outputs, the switching fabric being operable to switch a cell from any one of the fabric inputs to any one of a plurality of the fabric outputs, each of a plurality of the fabric inputs coupled to one of said input ports;

a plurality of output ports, each output port being operable to transmit an output port message having an indication of the emission and loss priorities of a cell received from the switching fabric, each output port coupled to one of said fabric outputs, each of the output ports includes an output queue for queuing cells that are awaiting transmission from the output port; and a traffic flow controller coupled to the input and output ports, the traffic flow controller being operable to formulate, in dependence upon the output port messages, the flow control message indicating, for a particular output port, the loss and emission priorities of cells to discard that are destined for that particular output port;

wherein the traffic flow controller further comprises:

an accumulator for maintaining a count for each output queue, each count corresponding to a level of congestion of its respective output queue, the level of congestion effecting the number of cells in that output queue;

a memory for storing a bandwidth priority matrix which defines a bandwidth priority for each combination of loss priority and emission priority;

a register for storing at least one threshold for each output queue, each of the thresholds for an output queue corresponding to a bandwidth priority; and a controller being operable to update and compare the count of each output queue to the thresholds of the output queue and determine the highest bandwidth priority corresponding to an exceeded threshold of that output queue, determine for each emission priority, the bandwidth priority of cells to discard in dependence upon said highest bandwidth priority corresponding to the emission priority, and encode the bandwidth priority of cells to discard into a flow control message indicating the loss priority and emission priority of cells to discard, the controller coupled to the accumulator, the memory and the register.

2. The data switch of claim 1, wherein:

each of the output ports includes a plurality of output queues and each of the output queues is for queuing cells of a unique emission priority; and the controller is operable to determine that for each output queue of an output port, cells having a lower bandwidth priority than the highest bandwidth priority of that output queue are to be discarded if they have the same emission priority of that output queue or a higher emission priority.

3. The data switch of claim 2, wherein:

the accumulator comprises a counter for each of the output queues, each of the counters being operable to store the count corresponding to the level of congestion in its respective output queue.

4. The data switch of claim 3, wherein the controller comprises:

an incrementor, coupled to the counters, for receiving output port messages and incrementing the counters in dependence upon the output port messages;

a timer for determining a cell period;

a priority scheduler, coupled to the timer, for determining for each output port, which counter to decrement in any given cell period, the priority scheduler operable to select the counter of the highest emission priority having a non-zero count;

a decrementor, coupled to the counters, for causing a counter to be decremented in response to the priority scheduler; and an encoder for comparing the count of each output queue to the thresholds of the output queue and determine the highest bandwidth priority corresponding to an exceeded threshold of that output queue, determining for each emission priority, the bandwidth priority of cells to discard in dependence upon said highest bandwidth priority corresponding to the emission priority, and encoding the bandwidth priority of cells to discard into a flow control message indicating the loss priority and emission priority of cells to discard, the controller coupled to the counters, the memory and the register.

5. The data switch of claim 1, wherein:

each of the output ports includes a scheduler for granting the transmission of cells from the output port, each of the schedulers being operable to include, in an output port message, an indication of the emission priorities of cells granted transmission.

6. The data switch of claim 5, wherein:

the memory is further for storing sets of state variables, each set of state variables representing transient congestion conditions of each output port, and storing a set of increment variables for incrementing the counts in dependence upon their respective set of state variables;

the controller is operable to update each set of state variables by determining, for each output port, a highest congested emission priority of cells not granted transmission and for filtering out transient downward priority changes thereto, and updating each of the counts in dependence upon the increment variables and the respective set of state variables for the count; and the controller is further operable to determine that for each output port, cells having a lower bandwidth priority than the highest bandwidth priority corresponding to an exceeded threshold of that output port are to be discarded if they have the same emission priority, or higher, as said highest congested emission priority.

7. The data switch of claim 6, wherein:

the controller in updating each set of state variables is further operable to filter out transient periods of no congestion.

8. The data switch of claim 1, wherein:

the register is further for storing a flow control threshold for each output queue; and the controller is further operable to compare the count of each output queue to the flow control threshold of the output queue and in response to the count exceeding the flow control threshold, encode a flow control message indicating that flow control is to be initiated for cells destined for that output queue.

9. A traffic flow controller for controlling traffic congestion in a data switch, the data switch including multiple input ports and output ports, the data switch being operable to switch data traffic in the form of cells received at the input ports to the output ports, each cell having an indication of loss priority and emission priority of the cell, the input ports being operable to discard cells in dependence upon flow control messages received from the traffic flow controller, the output ports operable to send output port messages to the traffic flow controller, the output port messages containing an indication of loss and emission priorities of cells received at the respective output port, the traffic flow controller comprising:

an accumulator for maintaining a count for each output port, each count corresponding to a level of congestion of its respective output port, the level of congestion effecting the number of cells in that output port;

a memory for storing a bandwidth priority matrix which defines a bandwidth priority for each combination of loss priority and emission priority;

a register for storing at least one threshold for each output port, each of the thresholds for an output port corresponding to a bandwidth priority; and a controller being operable to update and compare the count for each output port to the thresholds for the output port and determine the highest bandwidth priority corresponding to an exceeded threshold of that output port, determine for each emission priority, the bandwidth priority of cells to discard in dependence upon said highest bandwidth priority, and encode the bandwidth priority of cells to discard into a flow control message indicating the loss priority and emission priority of cells to discard, the controller coupled to the accumulator, the memory and the register.

10. The traffic flow controller of claim 9 for a data switch in which each of the output ports includes a plurality of output queues and each of the output queues is for queuing cells of a unique emission priority, wherein:

the controller is operable to determine that for each output queue of an output port, cells having a lower bandwidth priority than said highest bandwidth priority of that output queue are to be discarded if they have the same emission priority of that output queue or a higher emission priority.

11. The traffic flow controller of claim 11, wherein:

the accumulator comprises a counter for each of the output queues, each of the counters being operable to store the count corresponding to the level of congestion in its respective output queue.

12. The traffic flow controller of claim 11, wherein the controller comprises:

an incrementor, coupled to the counters, for receiving output port messages and incrementing the counters in dependence upon the output port messages;

a timer for determining a cell period;

a priority scheduler, coupled to the timer, for determining for each output port, which counter to decrement in any given cell period, the priority scheduler operable to select the counter of the highest emission priority having a non-zero count;

a decrementor, coupled to the counters, for causing a counter to be decremented in response to the priority scheduler; and an encoder for comparing the count of each output queue to the thresholds of the output queue and determine the highest bandwidth priority corresponding to an exceeded threshold of that output queue, determining for each emission priority, the bandwidth priority of cells to discard in dependence upon said highest bandwidth priority corresponding to the emission priority, and encoding the bandwidth priority of cells to discard into a flow control message indicating the loss priority and emission priority of cells to discard, the controller coupled to the counters, the memory and the register.

13. The traffic flow controller of claim 9 for a data switch in which each of the output ports includes a scheduler for granting the transmission of cells from the output port, each of the schedulers being operable to include, in an output port message, an indication of the emission priorities of cells granted transmission, wherein:

the memory is further for storing a sets of state variables, each set of state variables representing transient congestion conditions of each output port, and storing a set of increment variables for incrementing the counts;

the controller is operable to update each set of state variables by determining, for each output port, a highest congested emission priority without a grant and for filtering out transient downward priority changes thereto, and updating each of the counts in dependence upon the increment variables and the set of state variables associated with the output port; and the controller is further operable to determine, for each output port, cells having a lower bandwidth priority than the highest bandwidth priority corresponding to an exceeded threshold of that output port are to be discarded if they have the same, or higher, emission priority as said highest congested emission priority of the output port.

14. The traffic flow controller of claim 13, wherein:

the controller in updating each set of state variables is further operable to filter out transient periods of no congestion.

15. A method of controlling traffic flow in a data switch, the data switch operable to switch data traffic in the form of cells, each cell including a loss priority and an emission priority of the cell, the data switch including multiple input ports and output ports, the method comprising the steps of:

assigning a bandwidth priority to each combination of loss and emission priority;

updating a count, the count corresponding to a level of traffic congestion in particular output port;

determining, for the particular output port and for each mission priority the bandwidth priorities of cells to discard in dependence upon the count associated with the particular output port;

translating the bandwidth priorities of cells to discard into loss and emission priorities of cells to discard; and discarding, at the input ports, cells destined for the particular output port in response to the cells having loss and emission priorities matching said loss and emission priorities of cells to discard.

16. The method of claim 15, for a data switch in which the particular output port includes a plurality of output queues and each of the output queues is for queuing cells of a unique emission priority, wherein the step of updating comprises the step of:

updating counts, each count corresponding to a level of traffic congestion in an output queue.

17. The method of claim 16, wherein the step of updating further comprises the steps of:

detecting the emission priority of a cell entering the particular output port; and incrementing the count corresponding to the output queue of the particular output port.

18. The method of claim 17, wherein the step of updating further comprises the steps of:

detecting the end of a cell period;

determining, for the particular output port and cell period, the count to decrement in dependence upon the count for each output queue of the particular output port, the count chosen to decrement being a non-zero count having the highest emission priority of the queues in the particular output port; and decrementing the chosen count at the end of the cell period (original).

19. The method of claim 18, wherein the method further comprises an initial step of:

storing at least one threshold for each output queue, each of the thresholds for an output queue corresponding to a bandwidth priority, and wherein the step of determining, for a particular output port and for each emission priority, the bandwidth priority of cells to discard further comprises the steps of:

comparing the count of each output queue to the thresholds of the output queue;

determining, for each output queue, the highest bandwidth priority corresponding to an exceeded threshold of that output queue;

determining, for the particular output port, the bandwidth priority of cells to discard in dependence upon the highest bandwidth priorities of the particular output port;

encoding, for the particular output port, the bandwidth priority of cells to discard into a flow control message indicating the loss priority and emission priority of cells to discard; and sending the flow control message to the input ports.

20. The method of claim 19, wherein the step of determining, for the particular output port, the bandwidth priority of cells to discard, comprises the step of:

identifying, for each output queue of the particular output port, bandwidth priorities of cells to discard as being bandwidth priorities that are lower than the highest bandwidth priority corresponding to an exceeded threshold of the output queue and have the same emission priority as the output queue or a higher emission priority.

21. The method of claim 15, for a data switch in which the particular output port includes a plurality of output queues and each of the output queues is for queuing cells of a unique emission priority, the particular output port further includes a scheduler for granting the transmission of cells from the output queues, the scheduler being operable to include, in an output port message, an indication of the emission priorities of cells granted transmission, wherein the step of updating a count comprises the steps of:

calculating, for the particular output port, state-information which represents transient traffic congestion conditions at the particular output port; and updating, for the particular output port, the respective count in dependence upon the state information of the particular output port.

22. The method of claim 21, wherein the step of calculating comprises the steps of:

determining, for the particular output port from a respective output port message, the highest congested emission priority of a cell not granted transmission;

determining, for the particular output port, transient downward changes in the priority of said highest congested emission priority; and determining, for the particular output port, transient periods of no traffic congestion.

23. The method of claim 22, wherein the step of updating comprises the steps of:

filtering out, for the particular output port, transient downward changes in the priority of the respective highest congested emission priority;

filtering out, for the particular output port, transient periods of no traffic congestion; and updating, for the particular output port, the respective count in dependence upon the filtered highest congested emission priority and filtered periods of traffic congestion.

24. The method of claim 23, wherein the method further comprises an initial step of:

storing at least one threshold for the particular output port, each of the thresholds corresponding to a bandwidth priority, and wherein the step of determining, for the particular output port and for each emission. priority, the bandwidth priority of cells to discard further comprises the steps of:

comparing the count, for the particular output port, to the thresholds;

determining, for the particular port, the highest bandwidth priority corresponding to an exceeded threshold of the particular output port;

determining, for the particular output port, the bandwidth priority of cells to discard in dependence upon the highest bandwidth priority of the particular output port;

encoding, for the particular output port, the bandwidth priority of cells to discard into a flow control message indicating the loss priority and emission priority of cells to discard; and sending the flow control message to the input ports.

25. The method of claim 24, wherein the step of determining, for the particular output port, the bandwidth priority of cells to discard, comprises the step of:

identifying, bandwidth priorities of cells to discard as being bandwidth priorities that are lower than the highest bandwidth priority of the particular output port and have an emission priority that is equal to or higher than said highest congested emission priority of the particular output port.

26. The method of claim 15, wherein the step of determining further comprises the step of:

determining, for the particular output port, the emission priority of cells to flow control in dependence upon the count associated with the particular output port; and wherein the method further comprises the step of:

flow controlling, at the input ports, cells destined for the particular output port having an emission priority matching said emission priority of cells to flow control.

* * * * *

UNITED STATES PATENT AND TRADEMARK OFFICE
CERTIFICATE OF CORRECTION

| | | |
|---|---|---|
| PATENT NO. | : 6,721,273 B1 | Page 1 of 1 |
| APPLICATION NO. | : 09/496651 | |
| DATED | : April 13, 2004 | |
| INVENTOR(S) | : Lyon | |

It is certified that error appears in the above-identified patent and that said Letters Patent is hereby corrected as shown below:

At column 26, line 44, delete "11" and insert therefore --10--.

At column 27, line 47, delete "mission" and insert therefore --emission--.

At column 28, line 57, delete "–" after "state".

At column 29, line 24, delete the "." after the word "emission".

Signed and Sealed this

Twenty-sixth Day of June, 2007

JON W. DUDAS
*Director of the United States Patent and Trademark Office*